(12) United States Patent
Oomura

(10) Patent No.: US 8,587,811 B2
(45) Date of Patent: Nov. 19, 2013

(54) INFORMATION PROCESSING APPARATUS AND METHOD THEREOF

(75) Inventor: Hiroshi Oomura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 568 days.

(21) Appl. No.: 12/881,085

(22) Filed: Sep. 13, 2010

(65) Prior Publication Data

US 2011/0075205 A1    Mar. 31, 2011

(30) Foreign Application Priority Data

Sep. 29, 2009   (JP) ................................ 2009-224833

(51) Int. Cl.
*G06F 3/12*        (2006.01)

(52) U.S. Cl.
USPC .......... 358/1.15; 358/1.12; 358/1.13; 358/1.2

(58) Field of Classification Search
USPC ....................... 358/1.12, 1.13, 1.14, 1.15, 1.2
See application file for complete search history.

(56) References Cited

U.S. PATENT DOCUMENTS

| | | | |
|---|---|---|---|
| 5,881,213 A * | 3/1999 | Shaw et al. | ................... 358/1.15 |
| 7,131,775 B2 | 11/2006 | Uchida et al. | |
| 7,168,868 B2 | 1/2007 | Uchida et al. | |
| 7,319,532 B2 | 1/2008 | Oomura et al. | |
| 7,474,439 B2 | 1/2009 | Uchida et al. | |
| 7,589,862 B2 | 9/2009 | Uchida et al. | |
| 2003/0053082 A1* | 3/2003 | Tomito et al. | ................... 358/1.2 |
| 2004/0008366 A1* | 1/2004 | Ferlitsch | ...................... 358/1.15 |
| 2004/0136023 A1* | 7/2004 | Sato | .............................. 358/1.13 |
| 2009/0080958 A1 | 3/2009 | Uchida et al. | |
| 2009/0303510 A1 | 12/2009 | Uchida et al. | |

FOREIGN PATENT DOCUMENTS

| | | |
|---|---|---|
| JP | 2-120958 | 5/1990 |
| JP | 2004-94794 | 3/2004 |
| JP | 2006-134245 | 5/2006 |
| JP | 2007-65894 | 3/2007 |

OTHER PUBLICATIONS

HP Universal Print Driver Series for Windows—overview and features (http://h20338.www2.hp. com/hpsub/cache/342988-0-0-225-121.html).

* cited by examiner

*Primary Examiner* — Allen H Nguyen

(74) *Attorney, Agent, or Firm* — Fitzpatrick, Cella, Harper & Scinto

(57) ABSTRACT

In an environment in which many types of drivers are installed, it is cumbersome for a user to select a desired printer from a printer list displayed on a screen, after the user has issued a printing instruction from an application. In an information processing apparatus in the present invention, data which is received from an application in response to an instruction from a user is spooled as intermediate data, printers which are connected to the apparatus itself are retrieved after the instruction from the user, an installation process and creation of a print queue are performed for a printer driver which is compatible with a printer selected from found printers, the intermediate data is passed to the printer driver, and a printing process is performed. Then, a deletion candidate is decided in the created print queues, and the print queue which is the deletion candidate is deleted.

17 Claims, 17 Drawing Sheets

FIG. 9

8100 — DEVICE SPECIFICATION

| NAME | LOCATION |
|---|---|
| DeviceA | LIVING ROOM 1 |
| DeviceB | COPY ROOM |
| DeviceB | LIVING ROOM 2 |
| DeviceB | LIVING ROOM 3 |
| DeviceC | LIVING ROOM 1 |
| DeviceD | LIVING ROOM 1 |
| DeviceE | LIVING ROOM 1 |
| DeviceF | LIVING ROOM 1 |
| DeviceG | LIVING ROOM 1 |

[UPDATE DEVICE LIST]

MANAGE PRINT QUEUE
☑ KEEP PRINT QUEUE FOR WHICH PRINTING HAS BEEN PERFORMED
[DETAILED SETTING ...]

[NEXT] [CANCEL]

---

8200 — PRINTING - DeviceA - 192.168.0.1

FILE  EDIT  DISPLAY  HELP

| DOCUMENT NAME | THE NUMBER OF PAGES | PRINTING METHOD | LAYOUT | STATE |
|---|---|---|---|---|
| DOCUMENT 1 | 2 | SINGLE SIDED PRINTING | 1in1 | |
| DOCUMENT 2 | 5 | DOUBLE SIDED PRINTING | 2in1 | |

PAGE 1    PAGE 2

35%    1/2

THE NUMBER OF COPIES  [1]
☐ COLLATE
☐ BLACK AND WHITE PRINTING

[DETAILED SETTING] [RETURN TO INITIAL STATE]

[RETURN] [PRINT] [CANCEL]

(CONT.)

(FIG. 9 CONTINUED)
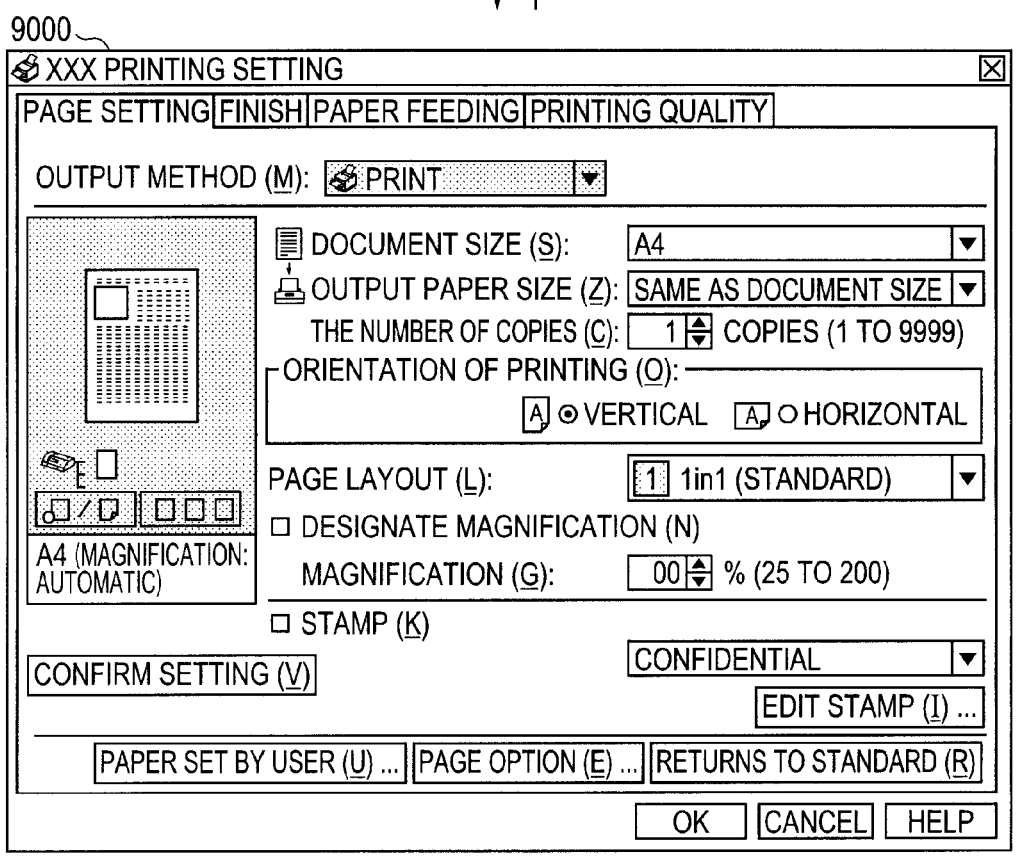

INFORMATION PROCESSING APPARATUS AND METHOD THEREOF

BACKGROUND OF THE INVENTION

1. Field of the Invention

The present invention relates to an information processing apparatus, and more particularly, to a system in which printing can be efficiently performed by only specifying a printer to be used, from placed printers, by a user at the time of the printing.

2. Description of the Related Art

Conventionally, in order to use a peripheral device such as a printer from a host computer, generally, a particular device driver which is compatible with the peripheral device needs to be incorporated in the host computer. A user or an administrator has been forced to perform installation work for previously checking information on an IP address or the like required for incorporating the device driver before printing, finding a compatible device driver from the Internet, and placing the device driver.

Consequently, in recent years, "universal driver" (generic printer driver), which is a common device driver that can be used regardless of a type of the peripheral device, has been researched and developed. For example, HP Universal Print Driver Series for Windows-overview and features (http://h20338.www2.hp.com/hpsub/cache/342988-0-0-225-121.html) discloses a method of issuing a printing instruction from an application to the generic printer driver, subsequently selecting a network printer that can perform output, and perform printing. According to this method, all printers which the generic printer driver is compatible with can be used by only previously incorporating the generic printer driver in an information processing apparatus.

However, since the generic printer driver shown in the above described article generates and transmits a command which can be processed by using common functions included in all the compatible printers, functions are limited in comparison with a case where the printing is performed by using a dedicated printer driver which is specialized in each printer. Moreover, basically, the printing cannot be performed for a printer of a type which cannot process a format of the command transmitted by the generic printer driver.

When the user performs the printing for the printer, the user issues the printing instruction from the application, selects a desired printer from a printer list displayed on a screen, and designates printing settings or the like. Here, the printer list displayed on the screen is displayed corresponding to a printer driver which has been installed and for which a print queue has been created.

For the user, depending on a document to be printed or the like, it is desirable to perform the printing depending on occasions, such as in a case where the generic printer driver as described above is used to simply perform the printing, and in a case where a dedicated printer is used to perform the printing. Therefore, in a host computer used by the user, such a situation can occur in which many types of drivers are installed and mixed. Furthermore, there is also an environment in which many types of printer drivers can be installed in the host computer by plug-and-play or the like without the user's intent.

In this way, in the environment in which many types of drivers are installed, it is cumbersome for the user to select the desired printer from the printer list displayed on the screen, after the user has issued the printing instruction from the application. Particularly, as described above, there are also printer drivers, such as the generic printer driver and the dedicated printer driver, which transmit a print job to the same printer but are different in functions. Thus, it is very difficult for the user to select a printer for performing the printing while taking full advantage of the functions included in the printer.

Therefore, an object of the present invention is to provide a method of managing device drivers so that the selection of the printer at the time of the printing may not be cumbersome, in such an environment in which many types of device drivers are installed in the host computer without the user's intent.

SUMMARY OF THE INVENTION

In order to solve the above problems, the present invention provides an information processing apparatus comprises: a spool unit configured to spool data which is received from an application in response to an instruction from a user, as intermediate data; a retrieval unit configured to retrieve printers which are connected to the apparatus, after the instruction from the user; a display control unit configured to display a list of printers found by the retrieval unit so that a printer which performs a printing process is selected; an installation control unit configured to control an installation process for a printer driver which is compatible with the printer selected from the list of the printers displayed by the display control unit; a creation unit configured to create a print queue corresponding to the printer driver installed by the installation control unit; a despool unit configured to, in response to an instruction from the user to perform printing for the printer driver installed by the installation control unit, pass the intermediate data spooled by the spool unit to the printer driver; a transmission unit configured to transmit a print job which is generated from the intermediate data passed by the despool unit by using the printer driver installed by the installation control unit, to the printer selected from the list of the printers displayed by the display control unit; a decision unit configured to decide a deletion candidate in the print queues created by the creation unit; and a deletion unit configured to delete the print queue which is the deletion candidate decided by the decision unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 is a transition diagram of a user interface.

DESCRIPTION OF THE EMBODIMENTS

Preferred embodiments of the present invention will now be described in detail in accordance with the accompanying drawings.

Figure 1A:
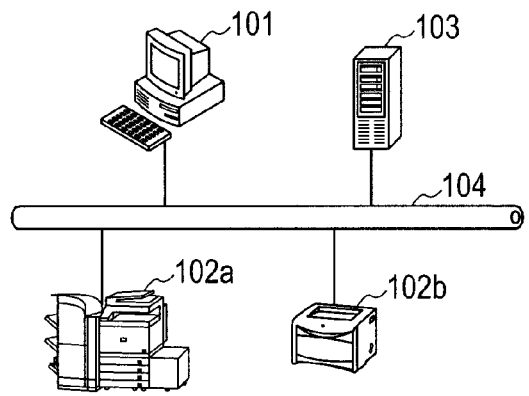
FIG. 1A is a configuration diagram of a system.

FIG. 1A is a block diagram illustrating a schematic configuration of a network system according to an embodiment of the present invention. This network system includes a host computer 101, peripheral devices which receive a job from this host computer 101 and process the job, and a distribution server 103 which distributes device drivers compatible with the peripheral devices. The host computer 101, the peripheral devices and the distribution server 103 are connected via a network 104. It should be noted that, in the present embodiment, an output device (printer) which receives print data and performs printing is described as the peripheral device.

Figure 1B:
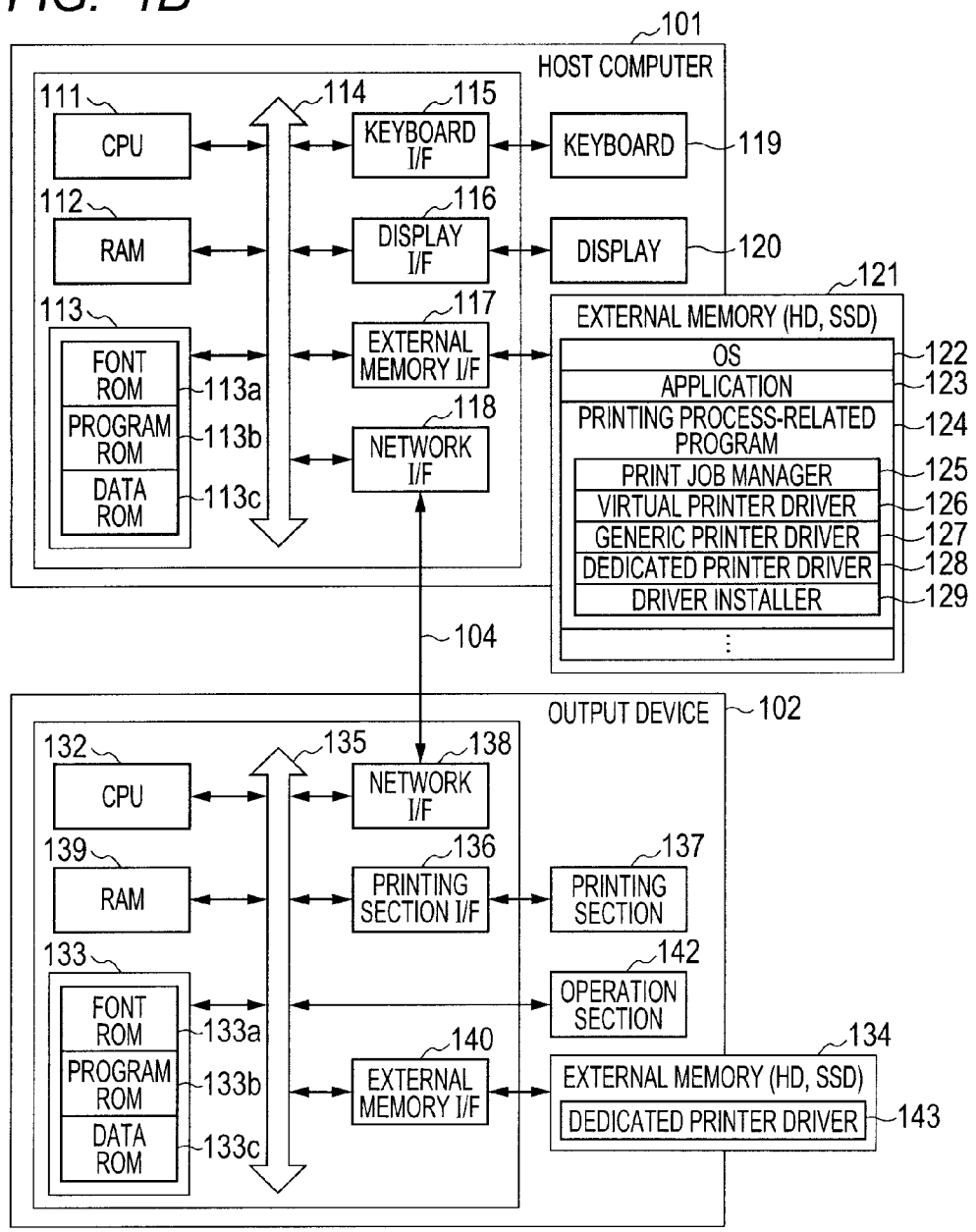
FIG. 1B is a block diagram illustrating internal apparatus configurations of a host computer and an output device.

FIG. 1B is a block diagram illustrating apparatus configurations of the host computer 101 and an output device 102 of FIG. 1A.

In the host computer 101, a CPU 111 performs general control of each device connected to a system bus 114, according to a program stored in a RAM 112. This RAM 112 also functions as a main memory, a work area and the like of the CPU 111. A ROM 113 stores various programs and data, and is configured to be partitioned into a font ROM 113a which stores various fonts, a program ROM 113b which stores a boot program, a BIOS and the like, and a data ROM 113c which stores various data. A keyboard controller I/F 115 controls key inputs from a keyboard 119 and a pointing device (mouse) (not illustrated). A display I/F 116 controls display on a display 120. An external memory I/F 117 controls, for example, accesses to an external memory 121 such as a hard disk (HD) or a Solid State Disk (SSD). The external memory 121 functions as a computer-readable storage medium which stores an operating system program (hereinafter, OS) 122, and in addition, various applications 123, a printing process-related program 124, and furthermore, a user file and an edited file (not illustrated) and the like. It should be noted that it is assumed that Microsoft Windows (registered trademark) is used herein as the OS 122. A network I/F 118 is connected to the output device 102 via the network 104, and performs a communication control process with respect to the output device 102. It should be noted that the distribution server 103 also includes an apparatus configuration similar to the host computer 101.

Here, the printing process-related program 124 becomes a program area which includes a print job manager 125, a virtual printer driver 126, a driver installer 129 and the like according to the present embodiment. A printing process based on these programs is enabled by downloading these programs by an arbitrary unit and performing an installation process to be described later. Moreover, in the printing process-related program 124, a generic printer driver 127 and a dedicated printer driver 128 to be installed in an information processing apparatus are also included. The virtual printer driver is a program which is used for printing a document specific to the present embodiment, not directly but indirectly, for a physical output device. Since this program is an indirect program, this program is called "virtual." However, since the virtual printer driver 126 is registered as a general printer driver on the OS 122, a user can perform work as if the work is close to a normal printing work procedure. On the other hand, the generic printer driver and the dedicated printer driver are classified as general printer drivers. Specifically, the generic printer driver is a printer driver which can perform the printing for a plurality of models. The generic printer driver can use common functions included in compatible models. On the other hand, the dedicated printer driver is a printer driver which is compatible with only a single model. The dedicated printer driver can take maximum advantage of the functions of the compatible model.

Next, a configuration of the output device 102 will be described. A CPU 132 controls the entire operation of the output device 102. A RAM 139 functions as a main memory, a work area and the like of the CPU 132, and is also used as an output information expansion area and an environment data storage area. Moreover, this RAM 139 also includes an NVRAM (Non-volatile RAM) area, and is configured so that a memory capacity can be expanded with an optional RAM which is connected to an expansion port (not illustrated). A ROM 133 includes a font ROM 133a which stores various fonts, a program ROM 133b which stores a control program executed by the CPU 132 and the like, and a data ROM 133c which stores various data. A network I/F 138 transmits and receives data, such as a print job and a status, to and from the host computer 101. A printing section I/F 136 controls an interface with a printing section 137 which is a printer engine. An external memory 134, for which accesses are controlled by an external memory I/F 140, includes a hard disk (HD), a Solid State Disk (SSD) and the like which are optionally connected, and stores font data, an emulation program, form data and the like. Furthermore, the dedicated printer driver 128 according to the present embodiment can also be stored. It should be noted that if the external memory 134 such as the hard disk is not connected, information and the like used in the host computer 101 are stored in the data ROM 133c of the ROM 133. It should be noted that this external memory 134 is not limited to one, and a plurality of the external memories 134 may be included. For example, a configuration may be employed in which, in addition to built-in fonts, a plurality of optional font cards, and a plurality of external memories, in which programs that interpret printer control languages with different language systems and the like are stored, can be connected. On an operation section 142, an operation panel which accepts the user's operation is provided, and a switch, an LED display unit and the like for the operation are arranged on the operation panel (not illustrated). Moreover, an NVRAM (not illustrated) may be included so that printer mode setting information from the operation panel may be stored. The CPU 132 outputs an image signal as output information via the printing section I/F 136 to the printing section 137, based on the control program and the like stored in the program ROM 133b of the ROM 133. Moreover, the CPU 132 can perform a communication process with the host computer 101 via the network I/F 138. The CPU 132 is configured to be able to receive the print data transmitted from the host computer 101, and also to notify the host computer 101 of the information and the like in the output device 102.

Figure 2:
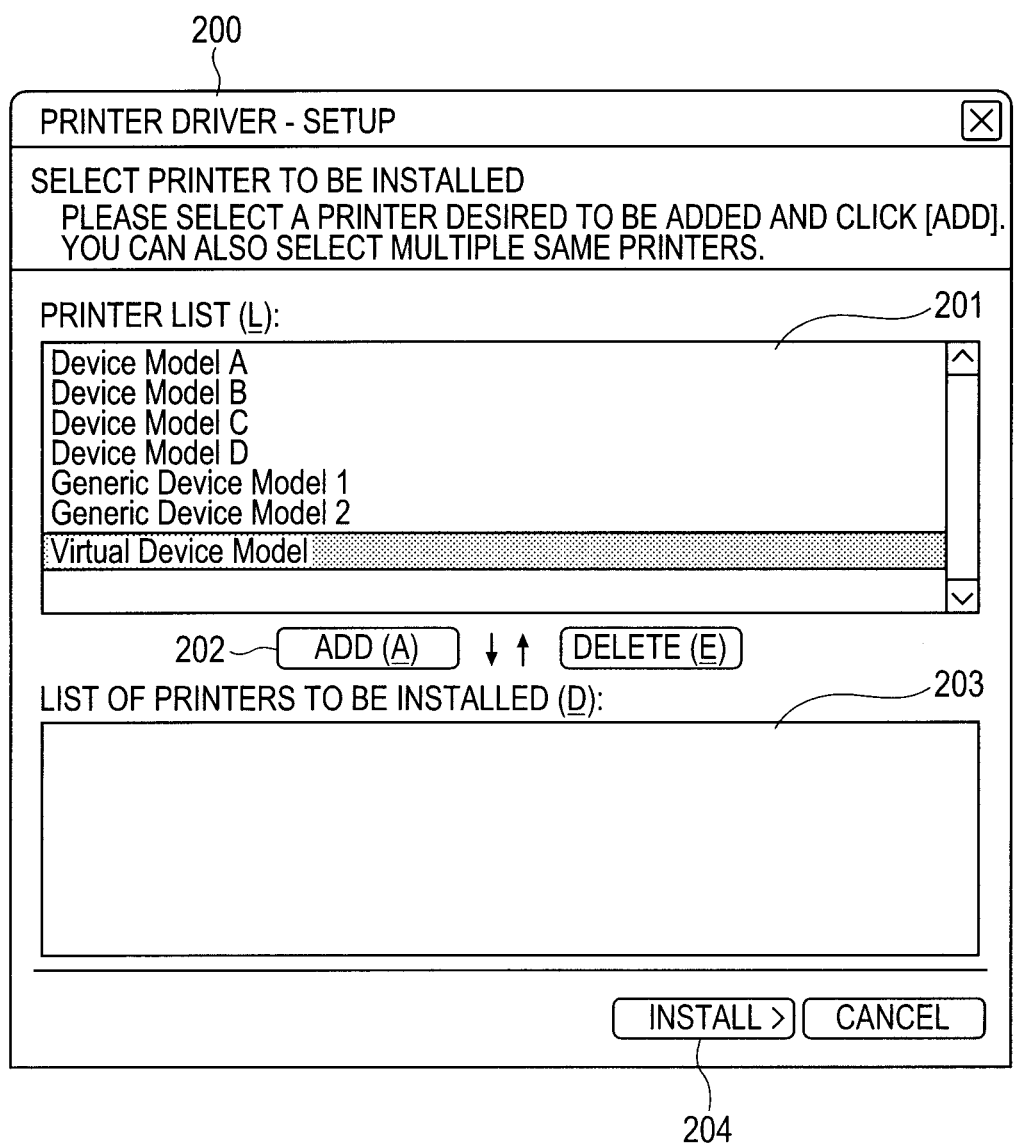
FIG. 2 is a diagram representing a user interface example of a driver installer.

FIG. 2 is a user interface 200 included in the driver installer 129 of FIG. 1B. When the driver installer 129 is executed, the user interface 200 is displayed on the display 120. In a PRINTER LIST 201, a list of installable printer drivers is displayed.

Device Model A is a dedicated printer driver compatible with an output device of a model A.

Device Model B is a dedicated printer driver compatible with an output device of a model B.

Device Model C is a dedicated printer driver compatible with an output device of a model C.

Device Model D is a dedicated printer driver compatible with an output device of a model D.

Generic Device Model 1 is a generic printer driver compatible with the models A and B.

Generic Device Model 2 is a generic printer driver compatible with the models C and D.

Virtual Device Model is a virtual printer driver which can be compatible with not only the models A, B, C and D, but also all the output devices.

The user selects an arbitrary model and depresses an ADD button 202 to add the selected model to a LIST OF PRINTERS TO BE INSTALLED 203. Subsequently, when the user depresses an INSTALL button 204, the driver installer 129 installs a printer driver of a designated model.

Figure 3:
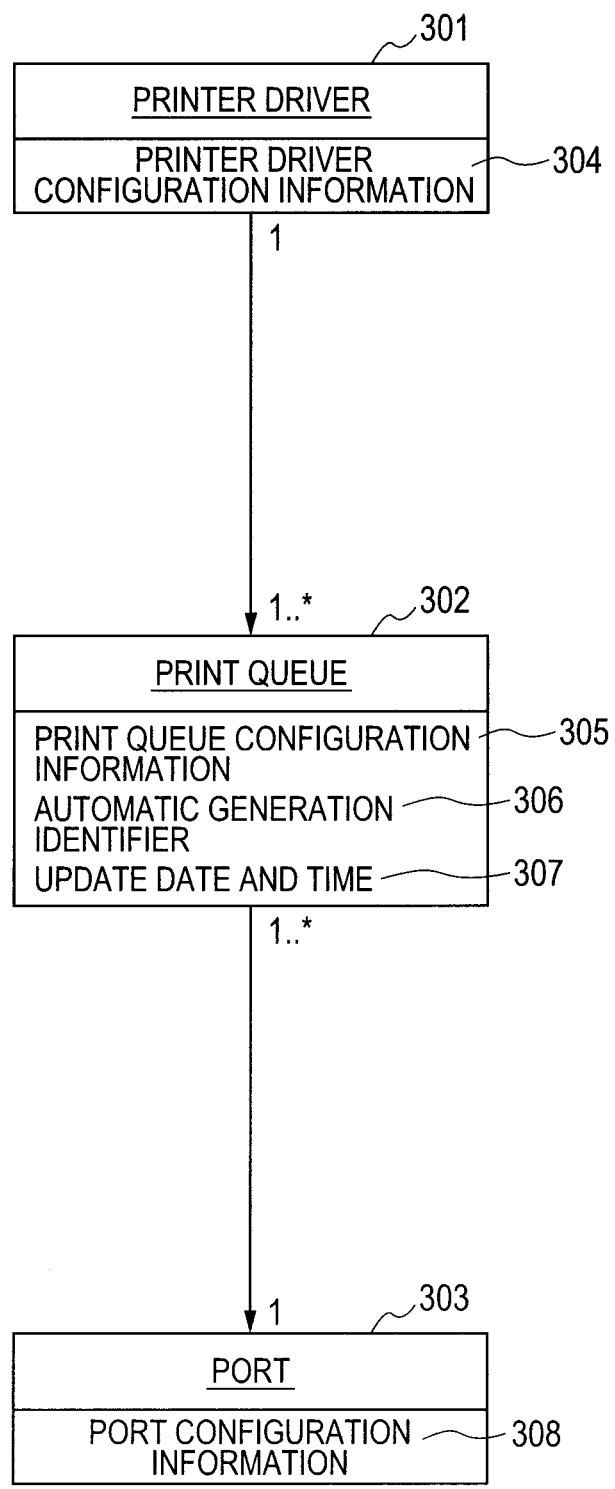
FIG. 3 is a diagram representing each information on a printer driver, a print queue and a port, and a relationship among the printer driver, the print queue and the port.

FIG. 3 is a diagram describing each information on the printer driver, a print queue and a port, and a relationship among the printer driver, the print queue and the port, which are represented by using a UML (Unified Modeling Language) object diagram.

A print queue 302 is an object which is a target to be printed when the printing is performed from the application. A plurality of the print queues 302 can be created from the printer driver 301 of the same model. For example, if three output devices of Device Model A have been introduced in an office, one printer driver compatible with Device Model A is installed, and three print queues using the printer driver are created. A port 303 is an object which specifies an output destination in the network. While a relationship between the print queue and port is typically a one-on-one relationship, the same port may be used by the plurality of print queues as illustrated in the figure.

The printer driver 301 retains printer driver configuration information 304. The printer driver configuration information 304 includes a driver version, a model name, hardware information, a driver module name and the like. This printer driver configuration information 304 is managed by the OS 122.

The print queue 302 retains print queue configuration information 305. The print queue configuration information 305 includes a print queue name, a port name, printing setting information, a job input time, a job status and the like. This print queue configuration information 305 is managed by the OS 122. Furthermore, the print queue 302 also retains an automatic generation identifier 306 and update date and time 307 specific to the present embodiment. These pieces of information are managed by the print job manager 125. Details will be described later.

The port 303 retains port configuration information 308. The port configuration information 308 includes a port name, a module name, an IP address and the like. This port configuration information 308 is managed by the OS 122.

Figure 4:
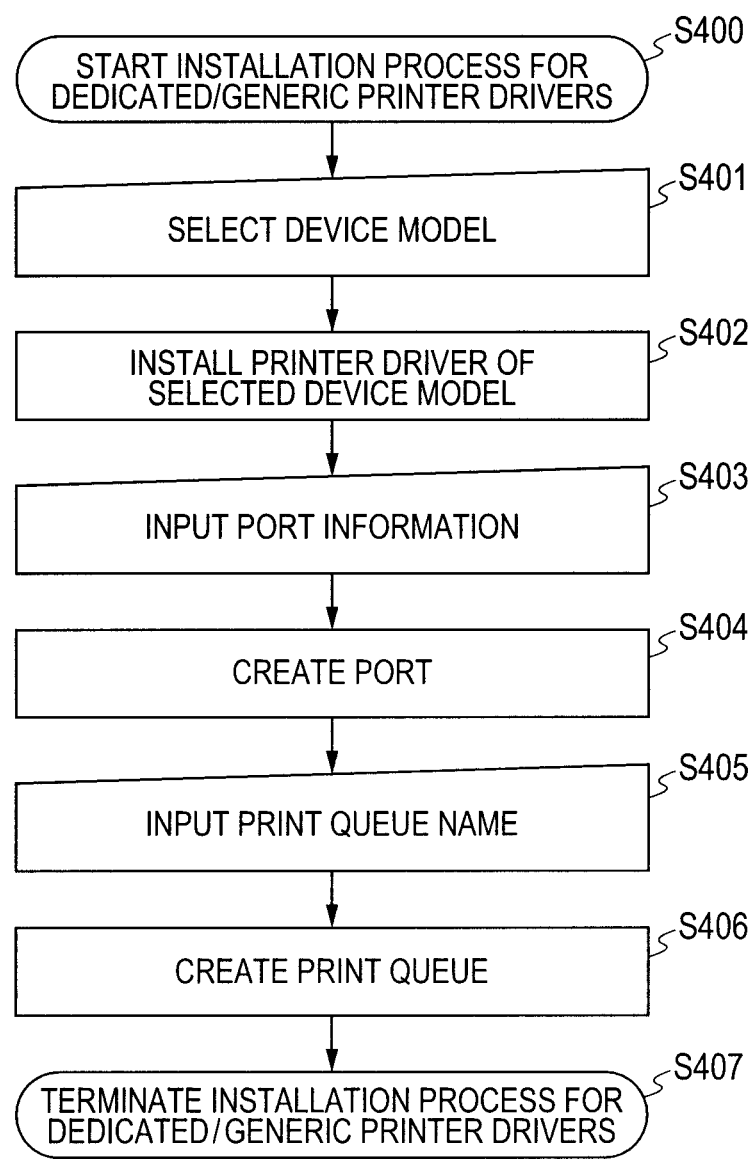
FIG. 4 is a flowchart illustrating an installation process for a general printer driver.

FIG. 4 is a flowchart illustrating an installation process for the general printer driver, which is performed by the driver installer 129 of FIG. 1B. The general printer driver refers to the dedicated printer driver and the generic printer driver.

When the installation of the printer driver is started (S400), first, the selection of the model which is made by the user is accepted (S401). Here, a case is assumed where a model other than Virtual Device Model has been selected in the PRINTER LIST 201 of FIG. 2. An installation process also including selection of Virtual Device Model specific to the present embodiment will be described later in FIG. 5. When the selection of one of the dedicated printer driver and the generic printer driver is accepted, the printer driver of the selected model is installed (S402).

The installation of the printer driver in S402 is performed by passing a path of a setting file (INF file), to a spooler API which is an installation API of the OS, by a printer driver installer. The spooler API, which is a part of the OS, searches a DLL (Dynamic Link Library) included in the printer driver, from a CD-ROM or an installation set according to the setting file. Then, the spooler API copies the searched DLL to a predetermined system directory of the OS. The spooler API records a driver name and the like in a registry according to the setting file. It should be noted that, when an instruction to display a printer folder has been issued, or an instruction to display a printer selection UI (for example, FIG. 8A or the like) has been issued from the application, the spooler API scans a data structure of the print queue to be registered in the registry of the OS. If the print queue corresponding to the printer driver has been set, the spooler API displays the print queue on the display. It should be noted that, here, since the print queue has not yet been created and set, a printer icon of the printer driver to be currently installed is not yet displayed in the user interface (for example, the printer selection UI) of the OS.

Next, an input of port information such as the IP address is accepted from the user (S403). Then, the port is created (S404). Next, an input of the print queue name is accepted from the user (S405). Then, the printer driver installed in S402 and the port created in S404 are associated with each other, and the print queue is created (S406). Then, the installation process for the dedicated printer driver and the generic printer driver is terminated (S407).

Figure 5:
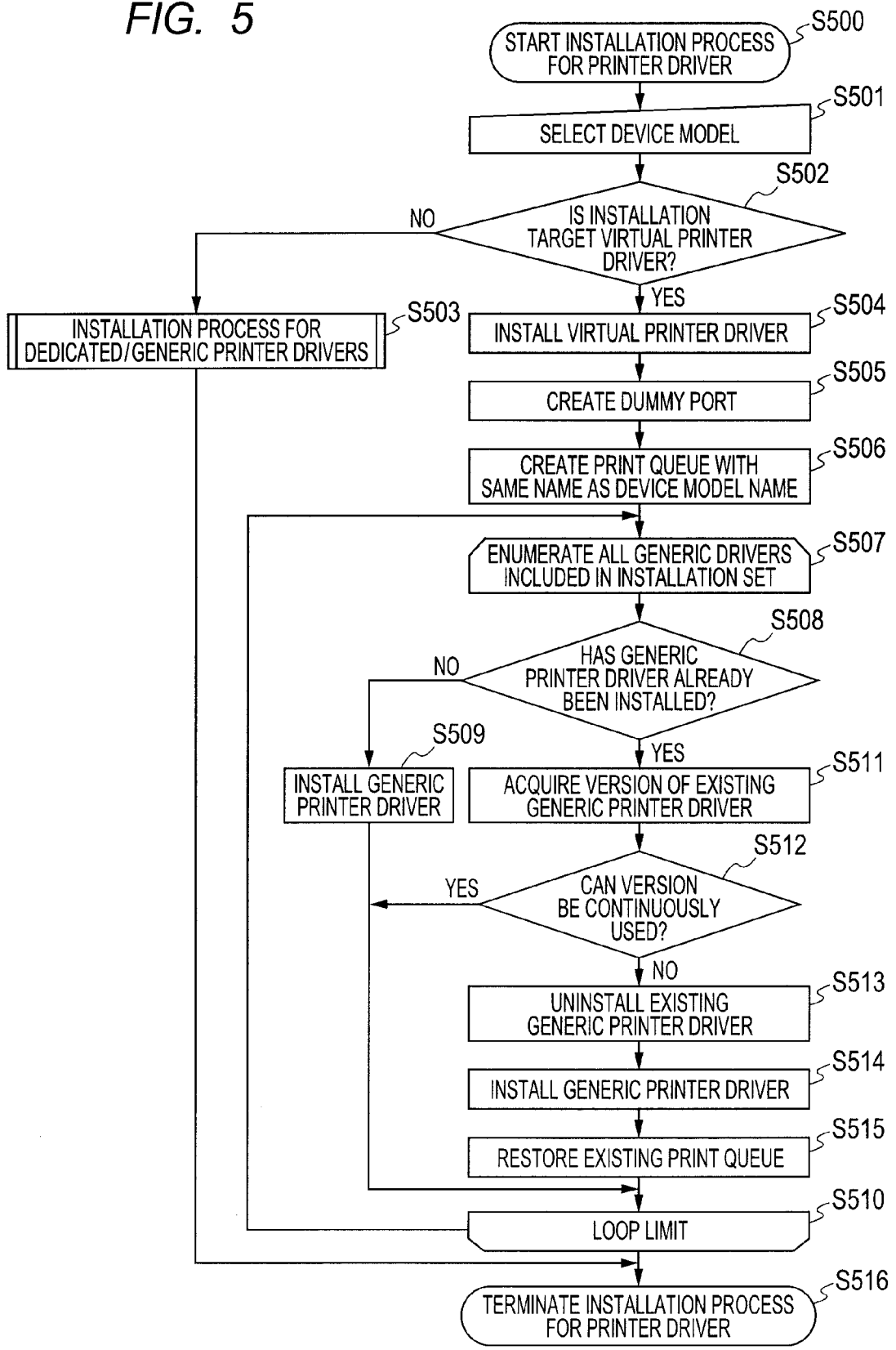
FIG. 5 is a flowchart illustrating an installation process for virtual/generic/dedicated printer drivers in the present embodiment.

FIG. 5 is a flowchart illustrating the installation process for the printer driver specific to the present embodiment, which is performed by the driver installer 129 of FIG. 1B.

When the installation of the printer driver is started (S500), first, the selection of the model which is made by the user is accepted (S501). Then, it is determined whether or not the selected model is the virtual printer driver (S502). If the selected model is not the virtual printer driver, the installation process for the dedicated/generic printer drivers is performed (S503). In S503, a process similar to a process in and after S402 of FIG. 4 is performed. Then, this installation process is terminated (S516).

In S502, if the selected model is the virtual printer driver, the virtual printer driver is installed (S504). Since the virtual printer driver itself does not output the print data to the port, a dummy port is created without any input from the user (S505). Here, the creation of the dummy port is, for example, a process as follows. A suitable name such as a nonexistent file name is designated, and an instruction to create a port is issued to the OS. Then, the creation instruction is recognized as an error by the OS, and a port name for which the creation instruction has been issued is discarded. Hence, the port is not actually created. Since there is no need to create a plurality of print queues for the virtual printer driver, the print queue is created with the same name as the model name, without any input from the user (S506). When the installation process for the general printer driver has been described in FIG. 4, there have been three inputs from the user in S401, S403 and S405. On the other hand, in the installation process for the printer driver specific to the present embodiment, there is only one input from the user in S501. If the driver installer 129 is a program which is targeted at only the virtual printer driver, S501 is not required either. In other words, a method of the installation process for the virtual printer driver has an effect of reducing a burden on the user and operational costs.

The virtual printer driver does not output the print data to the port. Consequently, the generic printer driver is placed in order to ensure the printing to the minimum. Continuously, the installation process for the generic printer driver will be described.

All the generic printer drivers included in the installation set are enumerated (S507 to S510). In the PRINTER LIST 201 of FIG. 2, as generic printers, there are Generic Device Model 1 and Generic Device Model 2. Hence, in a first loop process, Generic Device Model 1 is extracted, and in a second loop process, Generic Device Model 2 is extracted. It is determined whether or not the extracted generic printer driver has already been installed in the host computer 101 (S508). If the extracted generic printer driver has not yet been installed, the extracted generic printer driver is installed (S509). At this time, since the print queue using the generic printer driver is not created, the user is not conscious of the installation of the generic printer driver. Then, the process proceeds to S510. When the loop process is terminated, this installation process is terminated (S516).

In S508, if the extracted generic printer driver has already been installed in the host computer 101, a version of the installed generic printer driver is acquired (S511). It is determined whether or not the generic printer driver can be continuously used, based on a version number (S512). If it is determined that the generic printer driver can be continuously used, the process proceeds to S510. When the loop process is terminated, this installation process is terminated (S516).

In S512, if it is determined that the installed generic printer driver cannot be continuously used, the installed generic printer driver is uninstalled (S513). The uninstallation includes processes for deleting the DLL of the generic printer driver from the predetermined system directory managed by the OS, clearing the registry of the OS corresponding to the generic printer driver, and the like. On this occasion, the information on the print queue and the port are previously backed up. Then, the extracted generic printer driver is installed (S514). Furthermore, the print queue, which has been configured by using the installed generic printer driver before a process in S513 is performed, is restored by using the generic printer driver installed in S514 (S515). Here, a restoration process refers to a process for reflecting the name of the print queue, designation of the port and the like until then, as settings of the generic printer driver to be newly installed. Information to be restored can also be displayed to cause the user to select the information in the user interface of the driver installer, the OS or the like. Subsequently, the process proceeds to S510. When the loop process is terminated, this installation process is terminated (S516).

As described above, when the driver installer 129 installs the virtual printer driver and creates the print queue thereof, the generic printer driver is automatically installed. It should be noted that, in the description, the installation process for the generic printer driver in and after S507 is performed by the driver installer 129 of FIG. 1B. However, the installation process for the generic printer driver in and after S507 may be performed in an initialization process for the virtual printer driver 126. Moreover, the installation process for the generic printer driver in and after S507 may be performed in a printer driver setup module (not illustrated), which is generally referred to as VendorSetup and invoked from the OS 122.

Figure 6:
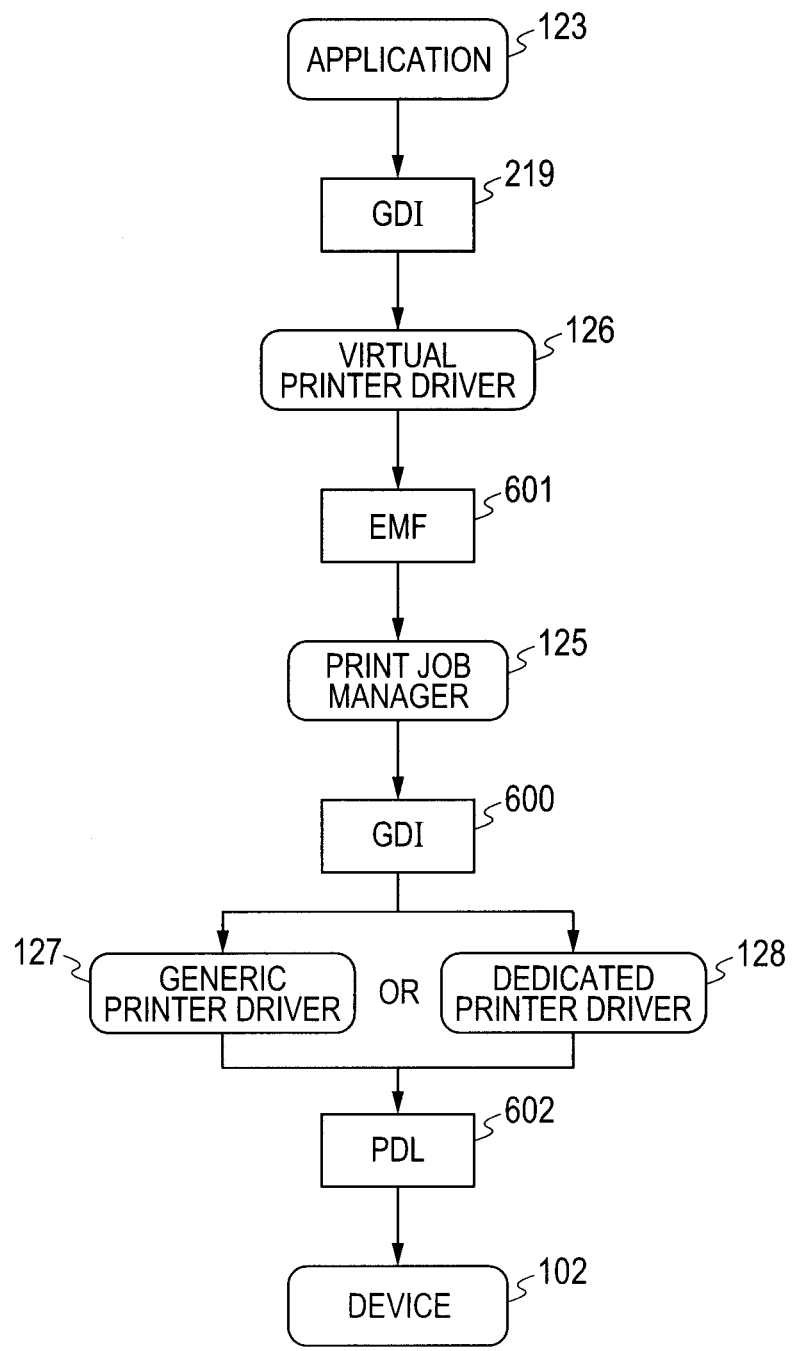
FIG. 6 is a data flow diagram of a printing process.

FIG. 6 is a data flow diagram related to a printing control process in the present invention. It will be clarified what input and output are performed among respective components of the printing process-related program, by using this figure.

The application 123 outputs a printing instruction command to the virtual printer driver 126, through a GDI (Graphic Device Interface) 600 which is a drawing interface provided by the OS 122. Next, the virtual printer driver 126 converts the input printing instruction command into a format of an EMF (Enhanced Meta File) 601, and outputs the command to the print job manager 125. Here, the EMF 601 is an intermediate data format compatible with the printing instruction command of the GDI 600, in which a series of printing instruction commands output from the application 123 is recorded as reproducible data. In the description of the present embodiment, the EMF 601 is used as the intermediate data format. However, with the data which can reproduce the printing instruction command, for example, an XPS (XML Paper Specification), a PDF (Portable Document Format), or an arbitrary format that has been uniquely defined may be employed.

Next, the print job manager 125 performs unique processes, such as specification of the output device to be described later and management of the generic/dedicated printer drivers, and outputs the printing instruction command through a GDI 600. The output printing instruction command is input to one of the generic printer driver 127 and the dedicated printer driver 128. Next, one of the generic printer driver 127 and the dedicated printer driver 128 converts the printing instruction command into a format of a PDL (Printer Description Language) 602 which can be processed by the output device 102, and outputs the printing instruction command as a job to the output device 102. Lastly, the output device 102 processes the input PDL 602 and performs print output.

Figure 7:
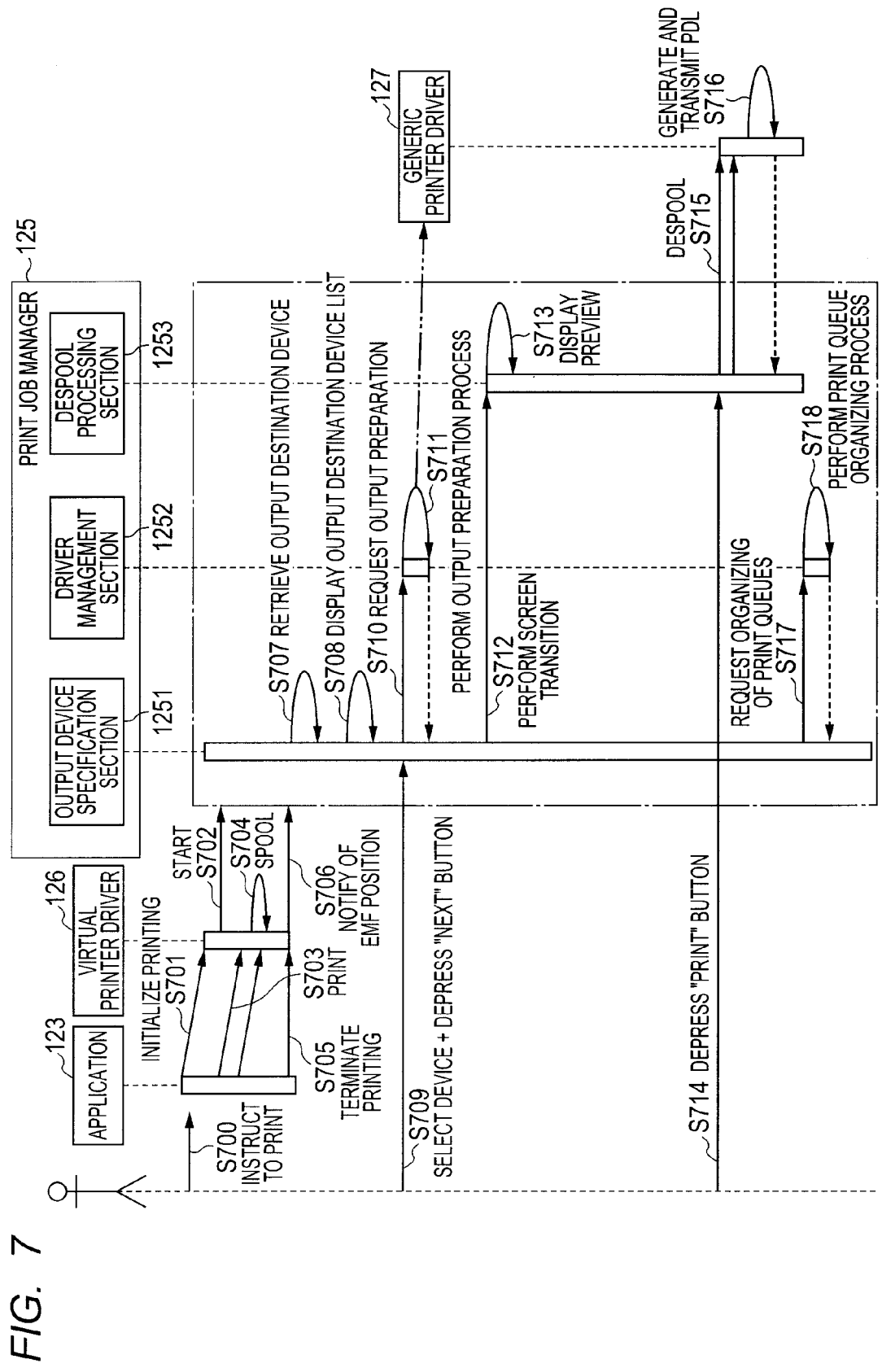
FIG. 7 is a sequence diagram of the printing process.

FIG. 7 is a sequence diagram of the printing process. It will be clarified what processes are performed inside and among the respective components of the related program in a series of the printing processes, by using this figure.

Figure 8A:
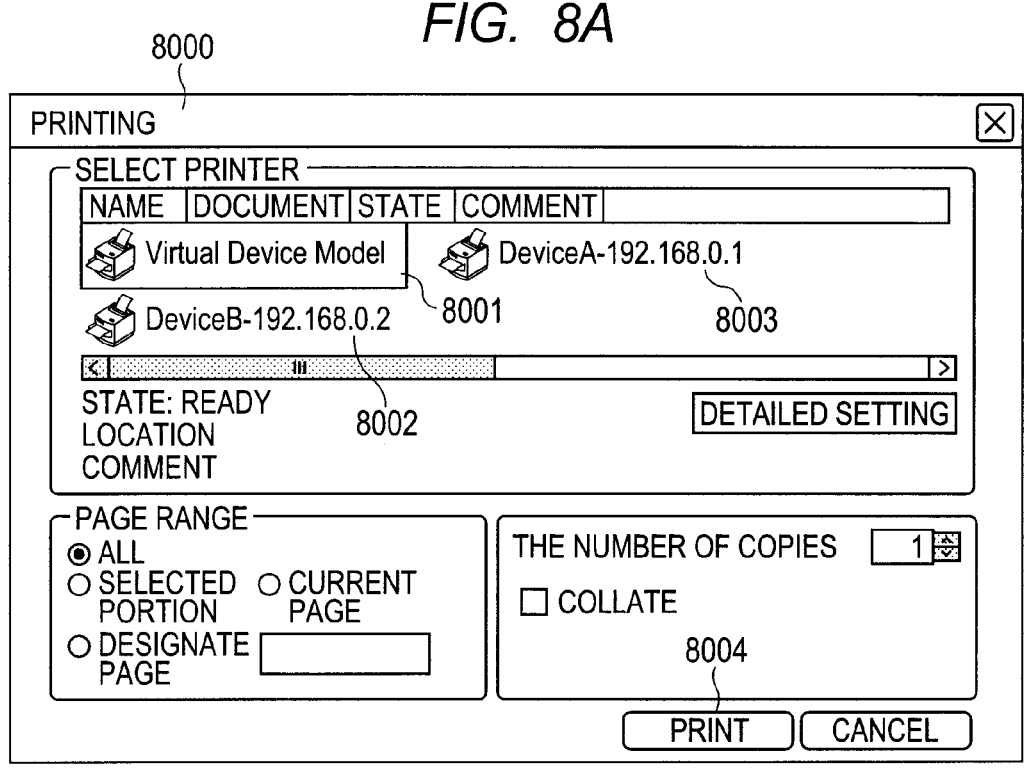
FIGS. 8A, 8B, 8C, 8D and 8E are diagrams representing user interface examples of an application and a print job manager.

First, the user inputs a printing instruction for a document desired to be printed, to the application 123 through a user interface 8000 illustrated in FIG. 8A (S700). Among icons 8001 to 8003 representing the print queues, the icon 8001 is the print queue of the virtual printer driver. The icons 8002 and 8003 are the print queues of the dedicated printer drivers. Here, since the output is performed through the virtual printer driver, the user selects the icon 8001, depresses a PRINT button 8004, and issues the printing instruction (S700).

Next, the application 123 performs a printing initialization process for the virtual printer driver 126 (S701). When the printing initialization is performed, the virtual printer driver 126 performs a process for starting the print job manager 125 (S702). In this way, the print job manager 125 is a program which is started after the printing of the document for the virtual printer driver 126 is started. The print job manager 125 is in charge of unique processes, such as display control for the specification of the output device to be described later, control of the installation of the generic/dedicated printer drivers, or the management of the generic/dedicated printer drivers. Moreover, the print job manager 125 includes an output device specification section 1251, a driver management section 1252, and a despool processing section 1253, as internal components.

Next, when the print job manager 125 is started, the application 123 starts the printing for the virtual printer driver 126, and outputs a series of printing/drawing commands through the GDI 600 (S703). The virtual printer driver 126 converts the input series of printing/drawing commands into the format of the EMF 601, and saves the input series of printing/ drawing commands in the external memory 121 so that the printing/drawing commands can be reproduced later. This process is referred to as "spool process" (S704). The application 123 performs a printing termination process at the end of the series of printing/drawing commands (S705). In response to the printing termination process, the virtual printer driver 126 notifies the print job manager 125 of saving location information on the saved EMF 601 in the external memory 121 (S706). It should be noted that, while the spool process is performed for the external memory 121 in S704, the spool process may be directly performed for the print job manager 125, without involving the external memory 121.

Next, the output device specification section 1251 retrieves the output device (S707). Here, the retrieval means communicating with output devices 102a and 102b connected to the network 104, and acquiring information on names, placement locations, IP addresses and hardware IDs of the output devices 102a and 102b. As a communication unit, a protocol such as an SNMP (Simple Network Management Protocol), which is a known art, is used. Typically, states of the output devices 102a and 102b, that is, whether or not the output devices 102a and 102b are powered on and whether or not the output devices 102a and 102b are connected to the network 104, cannot be previously grasped. Therefore, the output device specification section 1251 attempts to communicate with all the output devices for each printing instruction. For the communication with all the devices in the network, a unit for broadcasting, which is also a known art, is used. When the output device specification section 1251 transmits information acquisition data of the SNMP by this broadcast method through the network I/F 118, all the output devices 102 which are reachable in the network 104 receive the information acquisition data. Then, when each output device 102 transmits the information on the name, the placement location and the like of the output device designated as an acquisition target, as response data through the network I/F 138, the output device specification section 1251 sequentially receives the responses. Then, the received information is saved in the RAM 112. The output device specification section 1251 extracts the information on the device name, the placement location and the like from the sequentially received responses, and displays the information as a list in a user interface 8100 of FIG. 8B for the specification of the output device (S708). In the user interface 8100, a list control 8101 for displaying the information is arranged, and one piece of the information can be selected by a cursor 8102. When a button 8103 is depressed, the retrieval is performed again in the network, and a list of available output devices can be updated to a latest state. When a button 8104 is depressed, the device which is currently selected by the cursor 8102 is decided as an output destination. The output device specification section 1251 accepts the decision (S709), and moves to the next process. A checkbox 8105 and a button 8106 are operated by the user when the print queues are managed. Operation methods for the checkbox 8105 and the button 8106 will be described later.

When the device which is the output destination is decided in S709, the output device specification section 1251 requests the driver management section 1252 to execute an output preparation process (S710). As a result of the output preparation process in S711, the print queue of one of the generic printer driver 127 and the dedicated printer driver 128 (not illustrated), which can perform the printing for the selected output device 102, is registered in the OS 122. The output preparation process (S711) will be described in detail later by using FIGS. 10 and 11.

Figure 8B:
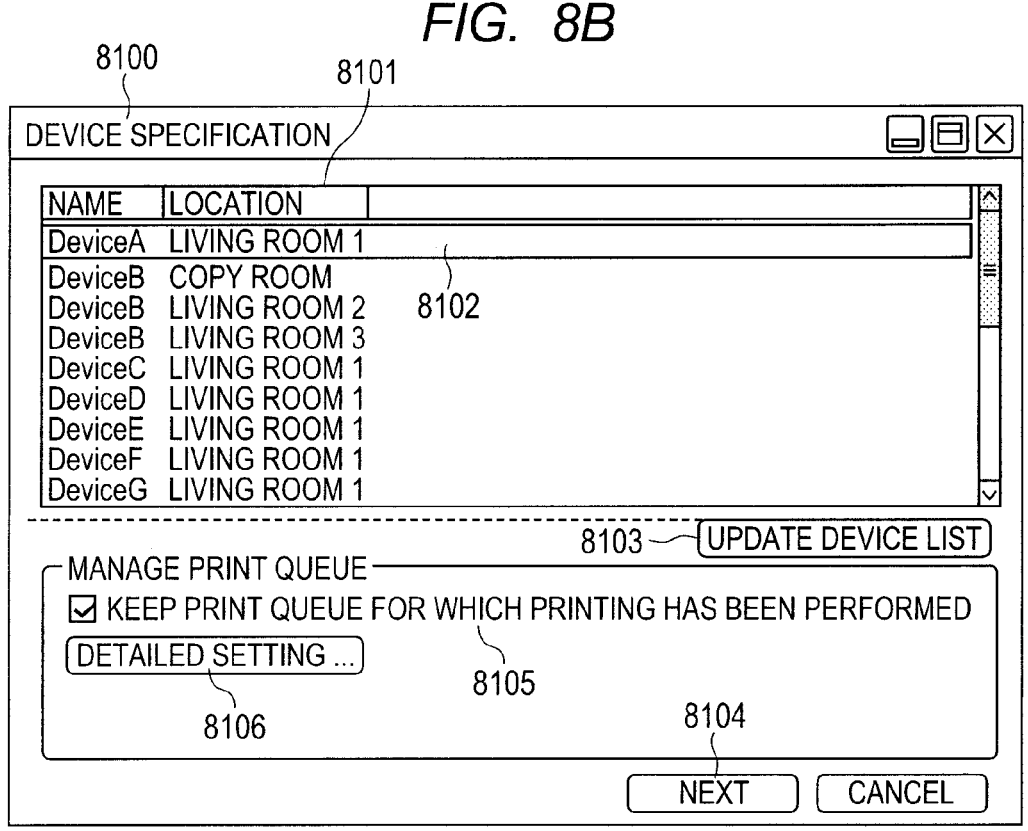
Figure 8C:
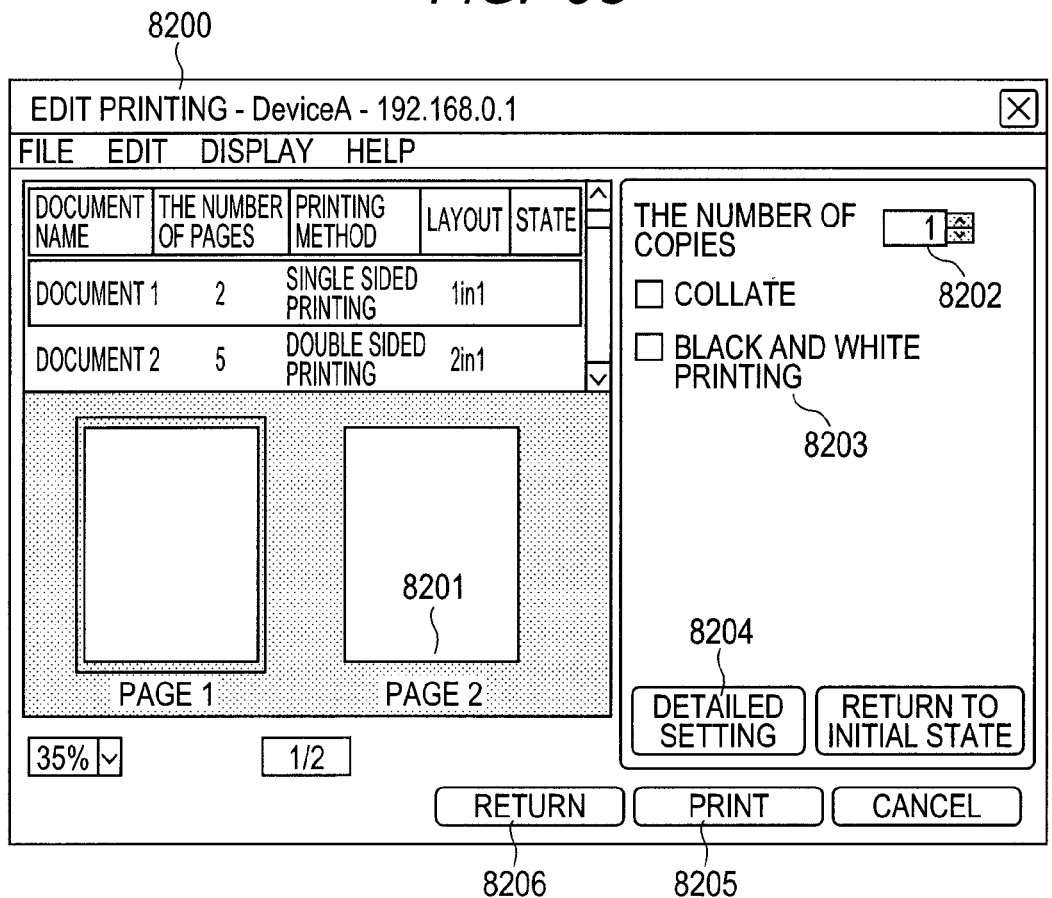

Next, the output device specification section 1251 performs transition from a screen for the output device specification of FIG. 8B, to a screen 8200 of FIG. 8C, which is included in the despool processing section 1253 (S712). The despool processing section 1253 displays an image of a print document which is actually printed, in a preview area 8201 (S713). The image displayed at this time is made by reading and analyzing the EMF 601 spooled in S704, and drawing the EMF 601 to fit in a size of the preview area 8201, by the despool processing section 1253. A spin control 8202 and a checkbox 8203 are input units which change general printing settings, such as the number of print copies and black and white printing, respectively. Furthermore, in order to change special printing settings, a user interface (not illustrated) unique to the printer driver can be displayed by depressing a button 8204, and an instruction to change the printing settings can be input. At this time, if the print queue corresponding to the output destination is the print queue of the dedicated printer driver 128, more advanced printing settings are enabled in comparison with the print queue of the generic printer driver 127. A button 8206 is an input unit which performs transition from the current screen 8200 back to the output device specification screen 8100 which is a previous screen. When the user depresses a button 8205 (S714), the despool processing section 1253 performs a despool process for the generic printer driver 127, and issues the series of printing/drawing commands (S715). Here, the despool process is reverse to the spool process, and is reading and analyzing data of the EMF 601 from the saving location information notified in S706, and reproducing the printing/drawing commands. Thereby, the printing process, which has been suspended for the processes unique to the print job manager 125, is resumed, and the print document is output. The generic printer driver 127 converts the input printing/drawing commands into the PDL 602, and transmits the input printing/drawing commands through the network I/F 138 to the output device 102 (S716). When the printing process is terminated, the output device specification section 1251 requests the driver management section 1252 to execute a print queue organizing process (S718), (S717). The print queue organizing process (S718) will be described in detail later by using FIGS. 12 to 14. Lastly, the print job manager 125 terminates the program.

FIG. 9 illustrates an outline of the transition of the user interface in the print job manager 125.

First, the print job manager 125 displays the "OUTPUT DEVICE SPECIFICATION" dialogue 8100. In response to the specification of the output device and the depression of the "NEXT" button 8104, the print job manager 125 displays the "EDITING PREVIEW" dialogue 8200. In the "EDITING PREVIEW" dialogue 8200, preview and confirmation of the print job, and basic printing settings are enabled. In response to the depression of the "PRINT" button 8205, the print job manager 125 executes the printing for the output device, and closes the same dialogue. In addition, in the "EDITING PREVIEW" dialogue 8200, the "DETAILED SETTING" button 8204 exists for setting specific functions included in the printer driver. In response to the depression of the "DETAILED SETTING" button 8204, the print job manager 125 displays a "PRINTING SETTING" dialogue 9000 for the printer driver. Furthermore, in the "EDITING PREVIEW" dialogue 8200, there is the "RETURN" button 8206. This "RETURN" button 8206 exists for resetting the output device when it is found that a desired function cannot be realized by a current output destination device. In response to the depression of the "RETURN" button 8206, the print job manager 125 displays the "OUTPUT DEVICE SPECIFICATION" dialogue 8100, and the designation of the output device is enabled again.

Figure 10:
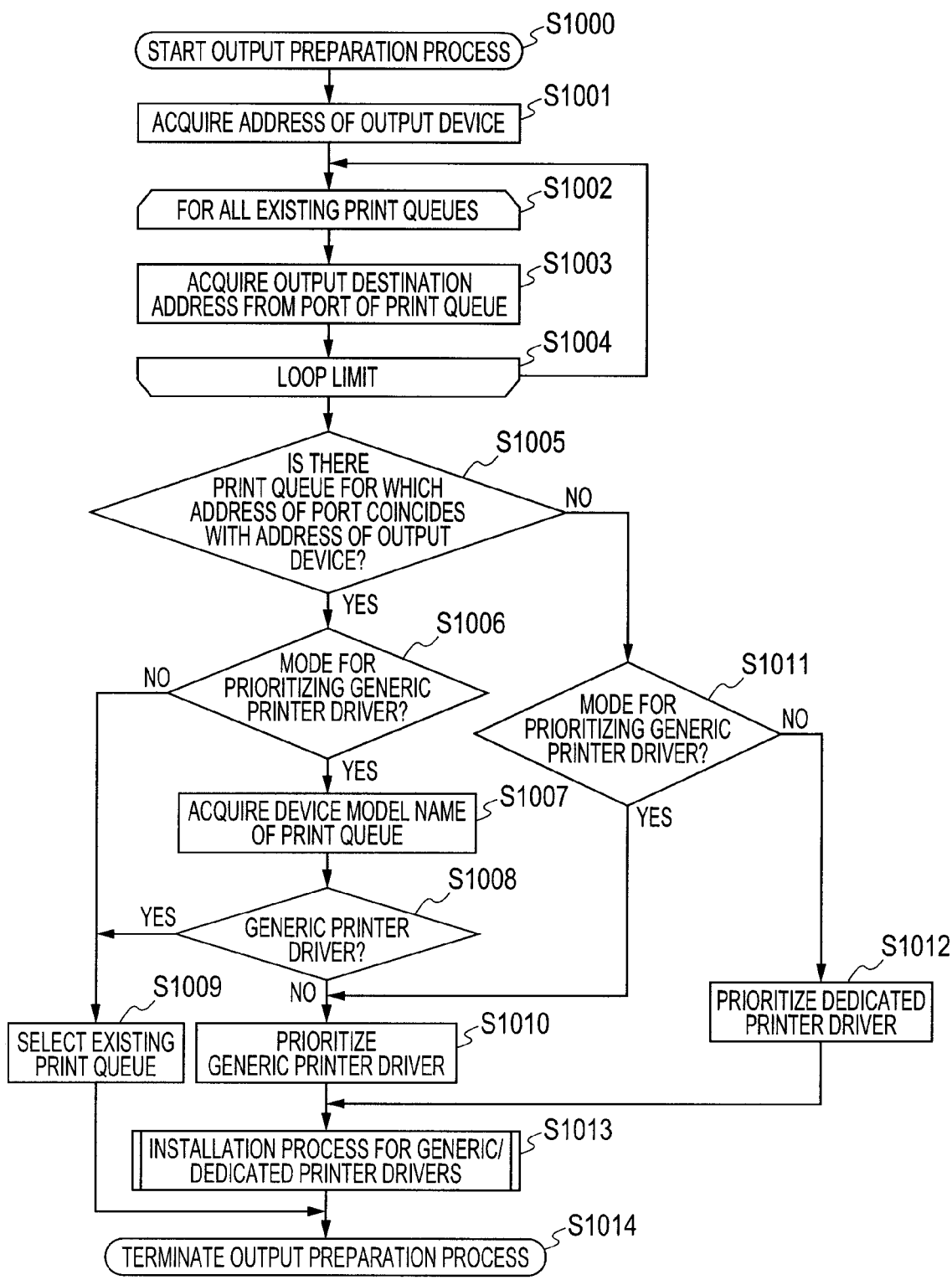
FIG. 10 is a flowchart of an output preparation process.

FIG. 10 is a flowchart representing a detailed flow of the output preparation process (S711) in the driver management section 1252. According to this process, if there is a print queue for which the printing is performed for the output device 102, the print queue is selected. Otherwise, a new print queue is created or an optimal printer driver is installed.

First, when the driver management section 1252 starts the output preparation process (S1000), the driver management section 1252 acquires the IP address information on the output device 102 (S1001). The IP address information, which has been acquired in the output device retrieval process (S707) and stored in the RAM 112, is extracted. Next, from all the print queues registered in the OS 122, the IP addresses of the ports associated with the print queues are acquired (S1002 to S1004).

Next, it is determined whether or not there is the print queue for which the IP address of the port coincides with the IP address of the output device 102 (S1005). As will be described later, in this system, the print queue is created for each output device. However, if another print queue is created each time the printing is performed for the same output device, a large amount of print queues are repeatedly registered. In order to avoid such a situation, it is determined whether or not there is the print queue for which the output is enabled, in existing print queues, by comparing the IP address of the output device with the IP addresses of all the print queues. If there is the print queue for which the output is enabled, the process proceeds to S1006. If there is no print queue for which the output is enabled, the process proceeds to S1011.

Next, in S1006, it is further determined whether or not a mode is a mode for prioritizing the generic printer driver. The print queues for which the output for a desired output device 102 is enabled may also include the print queue of the dedicated printer driver 128. However, some users do not require any advanced function and hope to use the generic printer driver 127 which is simple and stable. Therefore, for example, it is conceivable to provide a mode in which whether or not the generic printer driver is prioritized can be switched by a user interface (not illustrated). If this mode is true, that is, the generic printer driver is prioritized, the process proceeds to S1007. Otherwise, the process proceeds to S1009.

Next, in S1007, the model name of the print queue is acquired. Then, it is determined whether or not the device has also the model name for the generic printer driver (S1008). While the name of the print queue can be changed by the user, the model name of the generic printer driver is a unique name such as "Generic Device Model 1." Therefore, if the model name of the print queue is known, the type of the driver can be determined. In the case of the generic printer driver, the process proceeds to S1009. Otherwise, the process proceeds to S1010.

If the process proceeds to S1009, the existing print queue found in S1005 is decided as the output destination, and the output preparation process is terminated (S1014).

If the process proceeds to S1010, that is, if it is determined that the existing print queue is for the dedicated printer driver, it is decided that the generic printer driver is prioritized to be installed in a process to be described later in FIG. 11, and the process proceeds to S1013.

In S1011, similarly to S1006, it is determined whether or not the mode is the mode for prioritizing the generic printer driver. If true, the process proceeds to S1010. If false, the process proceeds to S1012. In S1012, it is decided that a conformable optimal driver is retrieved and installed in the process to be described later in FIG. 11, and the process proceeds to S1013. Here, in S1012, since there is no print queue for which the output is enabled, in the existing print queues, and the mode is not the mode for prioritizing the generic printer driver either, it is decided that the conformable optimal driver (the dedicated printer driver) is prioritized to be installed.

An installation process for the generic/dedicated printer drivers (S1013) will be described in detail by using FIG. 11.

Figure 11:
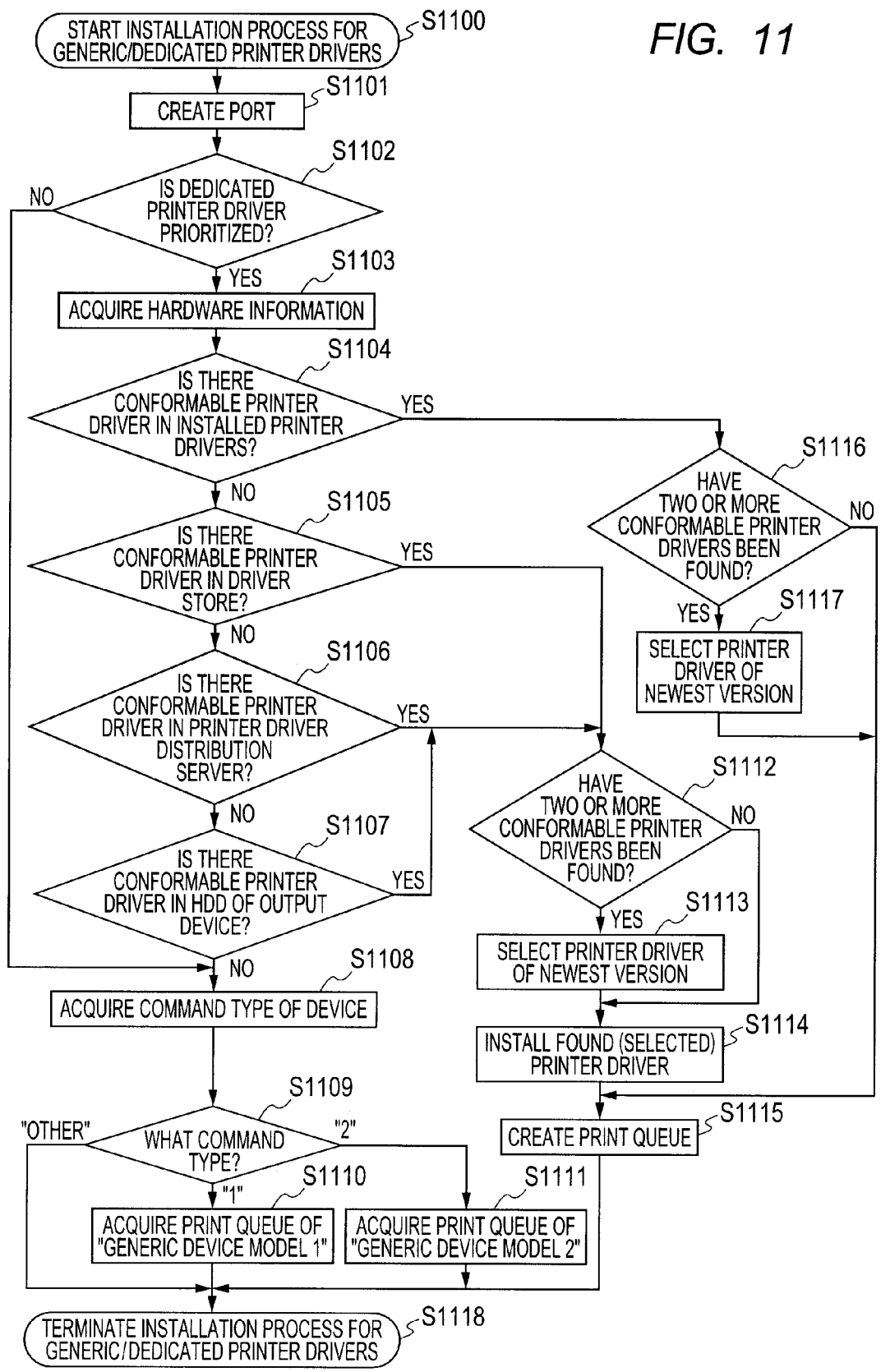
FIG. 11 is a flowchart of an installation process for the generic/dedicated printer drivers.

FIG. 11 is a flowchart representing a detailed flow of the installation process for the generic/dedicated printer drivers (S1013) in the driver management section 1252.

First, when the driver management section 1252 starts the process (S1100), the driver management section 1252 creates the port for the output (S1101). Next, it is determined whether or not it is decided that the dedicated printer driver of FIG. 10 is prioritized to be installed (S1102). If true, the process proceeds to S1103. If false, the process proceeds to S1108. Here, a case where the determination is true and the process proceeds to S1103 is a case where the process transits from step S1012 to the process in S1013 in FIG. 10. On the other hand, a case where the determination is false and the process proceeds to S1108 is a case where the process transits from step S1010 to the process in S1013 in FIGS. 10.

S1103 to S1107 are steps in which the dedicated printer driver 128 that is optimal for the output is retrieved from the storage area included in one of the host computer 101, the distribution server 103, and the output devices 102a and 102b. First, in S1103, hardware information on the output device is acquired. In the present embodiment, the hardware ID which is used for plug-and-play installation is acquired as the hardware information. The hardware ID, which has been acquired in the output device retrieval process (S707) and stored in the RAM 112, is extracted.

Next, in S1104, it is determined whether or not there is a conformable printer driver in the installed printer drivers. Specifically, the driver management section 1252 compares the hardware information on each printer driver which has been registered in the OS 122, with the hardware information on the output device 102 which has been acquired in S1103, and picks up all the printer drivers which coincide with the hardware information on the output device 102, if any. If there are one or more conformable printer drivers, the process proceeds to S1116. Otherwise, the process proceeds to S1105.

Next, in S1105, it is determined whether or not there is the conformable printer driver in a driver store. The driver store is a database system of the device drivers, which has been introduced in Windows Vista (registered trademark), and is a mechanism which stores a package of device drivers before being installed, in the OS 122. The driver management section 1252 can inquire of the OS 122 whether or not there is the printer driver that coincides with the hardware information on the output device 102 which has been acquired in S1103, in the printer drivers stored in this driver store. As a result of the inquiry, if there are one or more conformable printer drivers, the process proceeds to S1112. Otherwise, the process proceeds to S1106.

Next, in S1106, it is determined whether or not there is the conformable printer driver in the distribution server 103. The driver management section 1252 can inquire of the driver distribution server 103 whether or not there is the printer driver which is conformable with certain hardware information, by a unit of one of an RPC (Remote Procedure Call), an HTTP (Hyper Text Transfer Protocol) and the like, through the network 104. As a result of the inquiry, if there are one or more conformable printer drivers, a package of printer drivers is transferred from the distribution server 103 to the host computer 101, and stored in the external memory 121, and the process proceeds to S1112. Otherwise, the process proceeds to S1107.

Next, in S1107, it is determined whether or not there is the conformable driver, by retrieving the driver in the output device 102. As described above, the output device 102 can store the dedicated printer driver 128 required for using the output device itself, in the external memory 134. The driver management section 1252 can also inquire about this printer driver stored in the output device 102, by a unit similar to the unit in S1106, through the network 104. As a result of the inquiry, if there are one or more conformable printer drivers, data of the dedicated printer driver 128 is transferred from the output device 102 to the host computer 101, and stored in the external memory 121, and the process proceeds to S1112. As the result of the inquiry, if it is determined that there is no conformable printer driver because the dedicated printer driver 128 has been erased due to a change in settings of the external memory 134 or the like, the process proceeds to S1108.

In S1108 to S1111, as an alternative unit in a case where the conformable printer driver has not been found anywhere as a result of a series of processes in S1103 to S1107 as described above, the print queue of the generic printer driver, which has been previously installed in S500 to S516, is created. First, the driver management section 1252 acquires command type information on the output device 102 via the network 104 (S1108), and performs determination of the command type information (S1109). Here, the command type information is information representing a type of the PDL 602 which can be processed by the output device 102. While the generic printer driver 127 is a driver which issues the PDL that can be output to a plurality of models, the generic printer driver 127 just can issue only one type of the PDL. Therefore, since the output cannot be performed for a model supporting a different PDL, the command type information is acquired to confirm compatibility. In the present embodiment, it is assumed that the output device which is compatible with any one of two types of the PDL ("1" and "2") is used. However, there is also command type information which cannot be compatible. In S1109, it is determined whether the command type information is "1," "2" or the other type. In a case of "1," the process proceeds to S1110, and in a case of "2," the process proceeds to S1111. In S1110, the print queue of "Generic Device Model 1" which is compatible with the command type "1" is created, and the process is terminated (S1118). In S1111, the print queue of "Generic Device Model 2" which is compatible with the command type "2" is created, and the process is terminated (S1118). It should be noted that when the print queue is created, the port created in S1101 is associated with the print queue. On the other hand, if it is determined in S1109 that the command type information other than "1" and "2" has been acquired, the user is notified of an alarm such as "please select the other output device" via a screen, and also, this process is terminated (S1118).

Figure 8D:
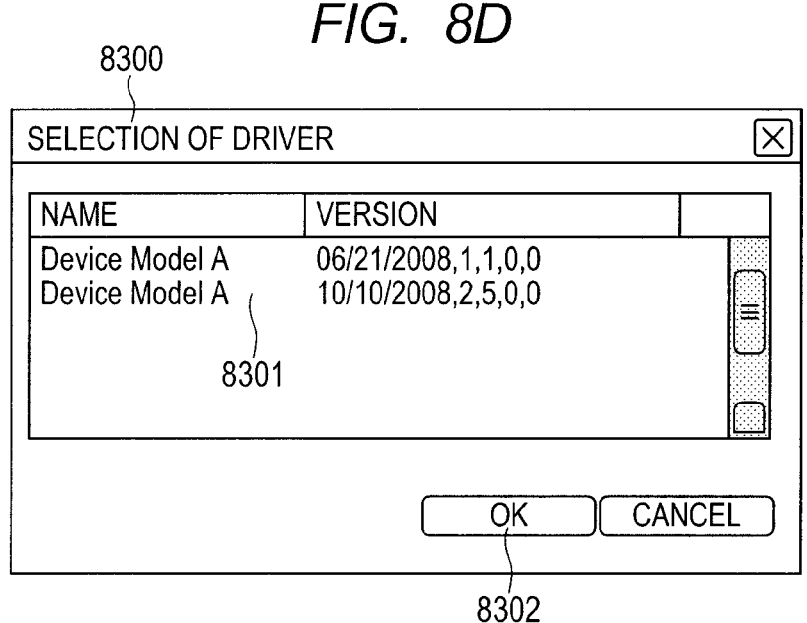

In S1112 to S1114, as a result of the retrieval, the conformable dedicated printer driver 128 is installed. First, in S1112, it is determined whether or not two or more conformable printer drivers have been found. If true, the process proceeds to S1113, and if false, the process proceeds to S1114. In S1113, the printer driver of the newest version is selected as a target to be installed, from the two or more conformable printer drivers. The version has been given to each printer driver, and even the printer drivers of the same model usually include different versions if the printer drivers have been created at different times. As a method of representing the version, for example, the version is represented by a combination of a date and a numerical value, such as "10/10/2008.2.5.0.0," so that it can be easily determined which has been newly created. However, infrequently, it may be necessary to dare to use a driver of an older version. In such a case, such a user interface 8300 as illustrated in FIG. 8D is displayed so that the user can select the printer driver. In a list 8301, the information (the name and the version) on a plurality of the printer drivers which have been determined to be conformable is displayed. The user can select a desired printer driver from the list 8301 and can decide the selection by depressing a button 8302. Next, in S1114, the conformable printer driver is installed, or if there is the plurality of conformable printer drivers, the printer driver selected in S1113 is installed.

Here, S1116 and S1117 are processes related to a special case of S1112 to S1114. Specifically, the processes are processes in a case where there is the conformable printer driver in the installed printer drivers for which the print queues are not yet created. S1116 is a process similar to S1112, and S1117 is a process similar to S1113. S1114 is not required because the installation of the printer driver is no longer required. Lastly, in S1115, the print queue associated with the port created in S1101 is created, and the process is terminated (S1118).

As described above, the print job manager 125 registers the print queue in the OS 122 at the time of the printing. On the next and subsequent printing, if the output device is already known, the print queue can be directly designated without involving the virtual printer driver 126, and the printing can be performed in a normal procedure without the step in which the output destination device is designated. However, if many output devices are placed in an office, or if the printing is performed while the user moves in a plurality of offices, the print queue is created each time, and thus, the number of the print queues tends to increase.

Moreover, as illustrated in the transition of the user interface of FIG. 9, the print job manager 125 can repeat the transition between the "OUTPUT DEVICE SPECIFICATION" dialogue 8100 and the "EDITING PREVIEW" dialogue 8200, any number of times. If the print queue for the output device selected in the "OUTPUT DEVICE" list box 8101 does not exist in the host computer 101, the print job manager 125 newly creates the print queue each time the transition is performed. Thus, the number of the print queues on the host computer 101 further tends to increase when the "RETURN" button 8206 is repeatedly depressed.

When the total number of the print queues on the host computer 101 becomes large, the number of the print queues displayed in the "PRINTING" dialogue 8000, which is displayed first at the time of the printing, becomes large. Thus, it is difficult for the user to select a suitable printer. Accordingly, a management unit, which can perform deletion and the like of the print queues that have been automatically generated, can improve usability.

Figure 8E:
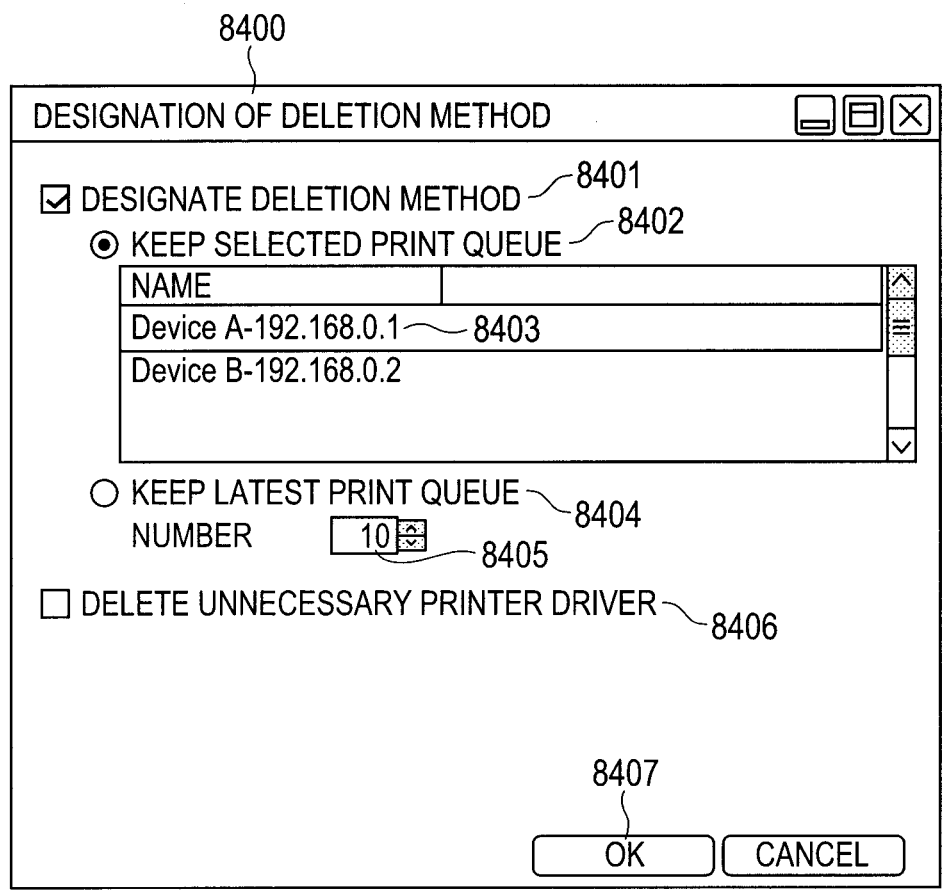

FIG. 8E illustrates a "DESIGNATION OF DELETION METHOD" dialogue 8400.

In response to the depression of the "DETAILED SETTING" button 8106 on the "OUTPUT DEVICE SPECIFICATION" dialogue 8100, the print job manager 125 displays the "DESIGNATION OF DELETION METHOD" dialogue 8400 on the display 120. In response to the depression of an "OK" button 8407 on the same dialogue, the print job manager 125 closes the "DESIGNATION OF DELETION METHOD" dialogue 8400. Subsequently, the "OUTPUT DEVICE SPECIFICATION" dialogue 8100 illustrated in FIG. 8B is displayed, and the print job manager 125 shifts the process to the dialogue 8100.

In the "DESIGNATION OF DELETION METHOD" dialogue 8400, there is a "DESIGNATE DELETION METHOD" checkbox 8401. This checkbox 8401 is unchecked in an initial state. When this checkbox 8401 is checked, items 8402 to 8405 are enabled, and detailed designation of the deletion method for the print queue is enabled.

For the detailed designation of the deletion method for the print queue, in the "DESIGNATION OF DELETION METHOD" dialogue 8400, there are a "KEEP SELECTED PRINT QUEUE" radio button 8402 and a "KEEP LATEST PRINT QUEUE" radio button 8404. The designation to these two radio buttons is exclusive. If the "KEEP SELECTED PRINT QUEUE" radio button 8402 is selected, the "KEEP LATEST PRINT QUEUE" radio button 8404 is set in an unselected state. Moreover, conversely, if the "KEEP LATEST PRINT QUEUE" radio button 8404 is selected, the "KEEP SELECTED PRINT QUEUE" radio button 8402 is set in the unselected state. In a default state, the "KEEP SELECTED PRINT QUEUE" radio button 8402 is in a selected state.

If the "KEEP SELECTED PRINT QUEUE" radio button 8402 is in the selected state, selection in a list box 8403 is enabled. The print job manager 125 lists the print queues created by the driver management section 1252, from the print queues existing on the host computer 101, and displays the print queues created by the driver management section 1252, in the list box 8403. However, the Virtual Device Model 8001, which is the print queue of the virtual printer driver 126, is not included in this list because the Virtual Device Model 8001 has not been created by the driver management section 1252 and is special. If the "OK" button 8407 is depressed when the "KEEP SELECTED PRINT QUEUE" radio button 8402 is in the selected state, the print job manager 125 recognizes the print queue which is not selected in the list box 8403, as a target to be deleted.

If the "KEEP LATEST PRINT QUEUE" radio button 8404 is in the selected state, designation in a NUMBER spin box 8405 is enabled. If the "OK" button 8407 is depressed when the "KEEP LATEST PRINT QUEUE" radio button 8404 is in the selected state, the print job manager 125 recognizes that setting in the NUMBER (upper limit number) spin box 8405 is enabled. The print queue which is set as the target to be deleted in this setting is limited to the print queue created on the host computer 101 by the driver management section 1252, similarly to the selection with the "KEEP SELECTED PRINT QUEUE" radio button 8402. In this setting, up to the designated number of the print queues having recent used date and time are kept, and the other print queues are deleted. Moreover, similarly, the Virtual Device Model 8001, which is the print queue of the virtual printer driver 126, is not included either.

In addition, in the "DESIGNATION OF DELETION METHOD" dialogue 8400, there is a "DELETE UNNECESSARY PRINTER DRIVER" checkbox 8406. In the default state, this checkbox 8406 is unchecked. If the "OK" button 8407 is depressed in a state where this checkbox 8406 is checked, the print job manager 125 determines that a request for deleting the printer driver itself which is no longer associated with the print queue is accepted. Based on information set in the "DESIGNATION OF DELETION METHOD" dialogue 8400, the print job manager 125 requests the driver management section 1252 to perform a printer driver organizing process. The printer driver organizing process will be described in detail later by using a flowchart of FIG. 12.

Figure 12:
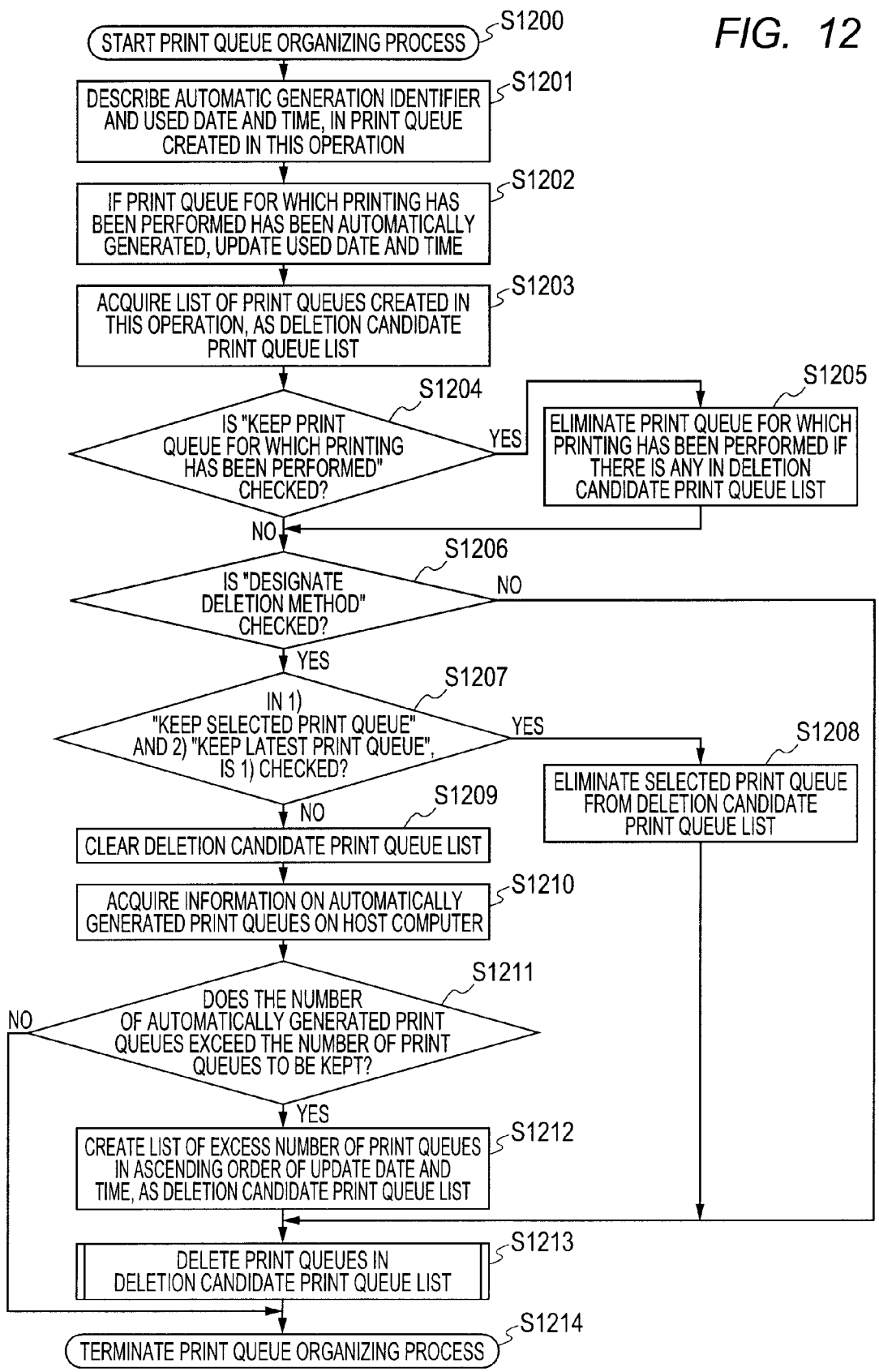
FIG. 12 is a flowchart of a print queue organizing process.

FIG. 12 illustrates a flowchart of the print queue organizing process performed by the driver management section 1252. In the present embodiment, this process is executed by the driver management section 1252 in a sequence of the printing process illustrated in FIG. 7, at a timing of the print queue organizing process (S718) after the printing is completed.

The print queue organizing process is started in S1200. The driver management section 1252 adds the automatic generation identifier 306 indicating that the print queue has been automatically generated by the driver management section 1252, to the data structure of the print queue 302. Furthermore, in addition, the driver management section 1252 describes current date and time in the update date and time 307 in the data structure of the print queue 302 (S1201).

Next, at a timing of the despool (S715) of FIG. 7, if the print queue which has been used in actual printing/drawing has been automatically generated, the update date and time 307 in the data structure of the print queue 302 is updated to the current date and time (S1202). The driver management section 1252 acquires a list of all the print queues which have been newly created at a timing of the output preparation process (S711) of FIG. 7, once (S1203). This list is herein referred to as "deletion candidate print queue list."

The driver management section 1252 confirms whether or not the "KEEP PRINT QUEUE FOR WHICH PRINTING HAS BEEN PERFORMED" checkbox 8105 in the "OUTPUT DEVICE SPECIFICATION" dialogue 8100 is in the selected state (S1204). If the "KEEP PRINT QUEUE FOR WHICH PRINTING HAS BEEN PERFORMED" checkbox 8105 is in the unselected state, the process proceeds to S1206. If the "KEEP PRINT QUEUE FOR WHICH PRINTING HAS BEEN PERFORMED" checkbox 8105 is in the selected state, the driver management section 1252 eliminates the print queue which has been used in the actual printing/drawing if there is any in the deletion candidate print queue list (S1205), and subsequently, the process proceeds to S1206. According to this process, at the timing of the despool (S715) of FIG. 7, the print queue which has been used in the actual printing/drawing can be eliminated from deletion candidates.

The driver management section 1252 confirms whether or not the "DESIGNATE DELETION METHOD" checkbox 8401 is in the selected state. If the "DESIGNATE DELETION METHOD" checkbox 8401 is in the unselected state, since an additional detailed deletion method has not been designated in the "DESIGNATION OF DELETION METHOD" dialogue 8400 of FIG. 8E, the process proceeds to S1213. Subsequently, the driver management section 1252 deletes the print queues in the deletion candidate print queue list (S1213), and terminates the print queue organizing process (S1214). A process for deleting the print queues in the deletion candidate print queue list in S1213 will be described later by using FIG. 13. On the other hand, if the "DESIGNATE DELETION METHOD" checkbox 8401 is in the selected state, a process flow is switched depending on the selected state of one of the "KEEP SELECTED PRINT QUEUE" radio button 8402 and the "KEEP LATEST PRINT QUEUE" radio button 8404 (S1207).

If the "KEEP SELECTED PRINT QUEUE" radio button 8402 is in the selected state, the process proceeds to S1208. In S1208, the driver management section 1252 eliminates the print queue selected on the list box 8403, from the deletion candidate print queue list. Subsequently, the driver management section 1252 deletes the print queues in the deletion candidate print queue list (S1213), and terminates the print queue organizing process (S1214).

If the "KEEP LATEST PRINT QUEUE" radio button 8404 is in the selected state, the process proceeds to S1209. In S1209, the driver management section 1252 clears the deletion candidate print queue list once. Continuously, the driver management section 1252 acquires a list of the print queues including the automatic generation identifier 306, in the print queues existing on the host computer 101 (S1210). The driver management section 1252 compares the number of the print queues in the acquired list of the print queues, with a numerical value designated in the "NUMBER" spin box 8405 (S1211). If the number of the print queues does not exceed the designated number, the process proceeds to S1214, and the print queue organizing process is terminated. If the number of the print queues exceeds the designated number, the acquired list of the print queues is sorted by the update date and time 307, and an excess number of the print queues in ascending order of date and time are set in the deletion candidate print queue list (S1212). Subsequently, the driver management section 1252 deletes the print queues in the deletion candidate print queue list (S1213), and terminates the print queue organizing process (S1214).

Figure 13:
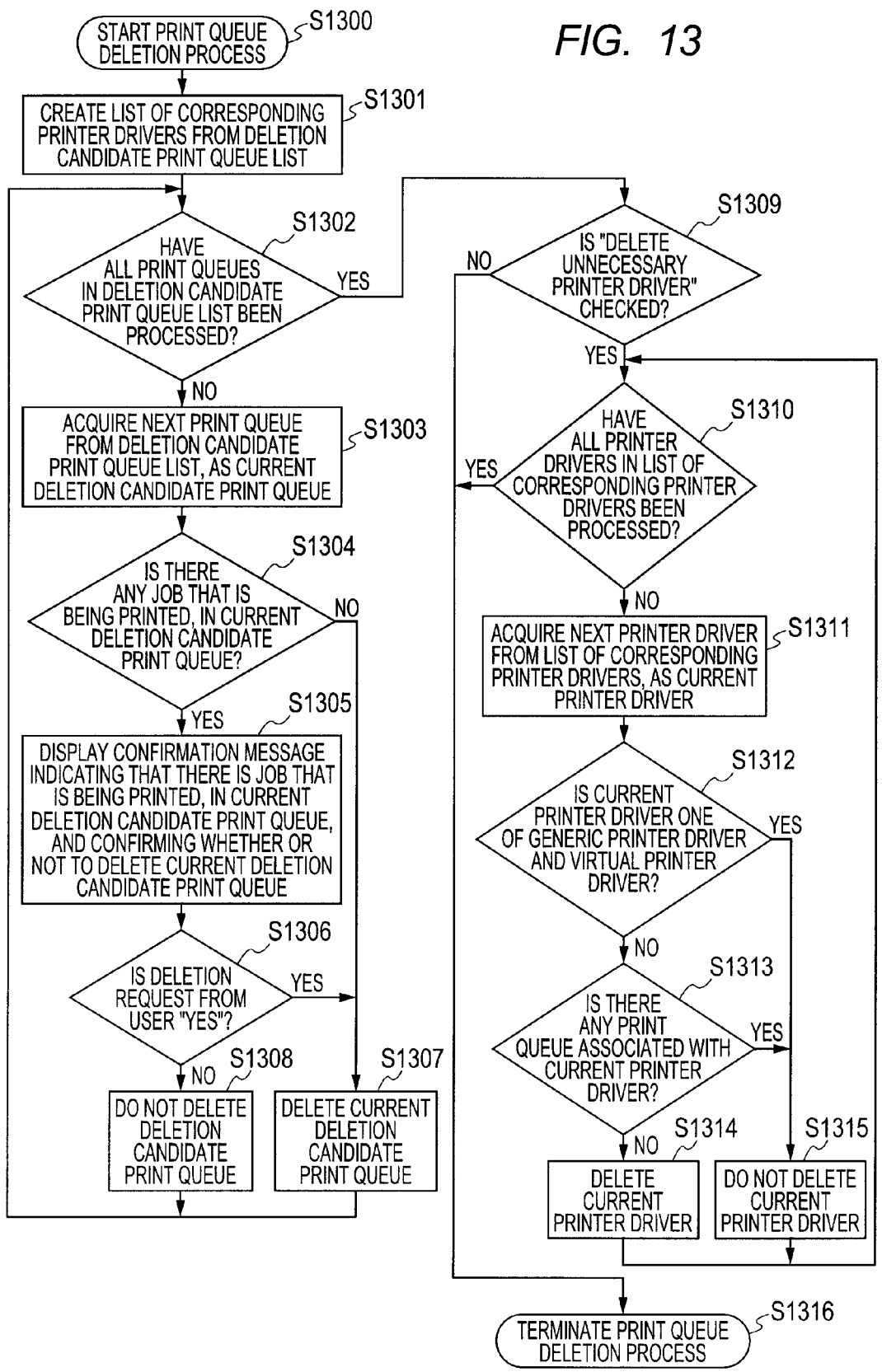
FIG. 13 is a flowchart of a print queue deletion process.

FIG. 13 illustrates a flowchart of the print queue deletion process performed by the driver management section 1252. This flowchart illustrates a detailed process in S1213 of the flowchart of the print queue organizing process of FIG. 12.

This process is started in S1300. The driver management section 1252 acquires various information on the printer driver, the print queue and the port as illustrated in FIG. 3, by calling a function provided by the OS 122. The information is used to create and save a list of the printer drivers 301, which are associated with all the print queues 302 included in the deletion candidate print queue list generated by the flowchart of the print queue organizing process of FIG. 12 (S1301). This list is a deletion candidate printer driver list, and if there is any unnecessary printer driver, the unnecessary printer driver is deleted in and after S1309.

Next, the driver management section 1252 determines whether or not all the print queues in the deletion candidate print queue list have been processed (S1302). If there is any unprocessed print queue in the deletion candidate print queue list, the process proceeds to S1303, and the driver management section 1252 acquires any unprocessed print queue as a current deletion candidate print queue. The driver management section 1252 determines whether or not there is any job that is being printed or is waiting, in the current deletion candidate print queue, and the print queue is being used (S1304). If the print queue is being used, the driver management section 1252 displays a confirmation message (not illustrated) to the user to confirm whether or not to delete the print queue (S1305). Here, the driver management section 1252 determines whether or not a deletion request from the user is accepted (S1306). If the deletion request from the user is "YES," the process proceeds to S1307, in order to perform the deletion process for the current deletion candidate print queue. If the deletion request from the user is "NO," the process proceeds to S1308, the deletion process for the current deletion candidate print queue is not performed, and the process returns to S1302. In S1304, if it is determined that the current deletion candidate print queue is not being used, the process proceeds to S1307, in order to perform the deletion process for the current deletion candidate print queue. In S1307, the driver management section 1252 performs the deletion process for the current deletion candidate print queue by calling a function provided by the OS 122, and subsequently, the process returns to S1302. Here, if the OS 122 cannot delete the current deletion candidate print queue for some reason, an error message (not illustrated) is displayed indicating that the deletion has been impossible, and the process returns to S1302. In S1302, if the driver management section 1252 determines that all the print queues in the deletion candidate print queue list have been processed, the process proceeds to S1309.

In S1309, the driver management section 1252 confirms whether or not the "DELETE UNNECESSARY PRINTER DRIVER" checkbox 8406 is selected. If the "DELETE UNNECESSARY PRINTER DRIVER" checkbox 8406 is not selected, the process proceeds to S1316, and the print queue deletion process is terminated. If the "DELETE UNNECESSARY PRINTER DRIVER" checkbox 8406 is selected, the process proceeds to S1310.

In S1310, the driver management section 1252 determine whether or not processes in and after S1311 have been performed for all the printer drivers in the deletion candidate printer driver list generated in S1301. If the processes have been performed for all the printer drivers in the deletion candidate printer driver list, the process exits a loop process and proceeds to S1316, and the print queue deletion process is terminated. If there is any unprocessed printer driver in the deletion candidate printer driver list, the process proceeds to S1311, and any unprocessed printer driver is acquired as a current deletion candidate printer driver. In S1312, the driver management section 1252 determines whether the current deletion candidate printer driver is not one of the generic printer driver 127 and the virtual printer driver 126, by using the model name of the current deletion candidate printer driver. If the current deletion candidate printer driver is one of these printer drivers, in order to enable the next and subsequent printing by using the virtual printer driver 126, the process proceeds to S1315. The driver management section 1252 does not delete the current deletion candidate printer driver, and the process returns to S1310. If the current deletion candidate printer driver is not one of the generic printer driver and the virtual printer driver, the process proceeds to S1313. It should be noted that, in the present embodiment, although the model name is used to determine whether or not the current deletion candidate printer driver is one of the generic printer driver 127 and the virtual printer driver 126, it is not particularly necessary to limit identification information and a method thereof. For example, another identifier may be included as a part of the information in the printer driver configuration information 304.

In S1313, the driver management section 1252 acquires the various information on the printer driver, the print queue and the port as illustrated in FIG. 3, by calling the function provided by the OS 122. It is determined whether or not the current deletion candidate printer driver is associated with another print queue. If there is no print queue associated with the current deletion candidate printer driver, the process proceeds to S1314, and the current deletion candidate printer driver is deleted. If there is any print queue associated with the current deletion candidate printer driver, the process proceeds to S1315. Then, the current deletion candidate printer driver is not deleted, and the process returns to S1310. In S1314, the driver management section 1252 performs the deletion process for the current deletion candidate printer driver by calling the function provided by the OS 122, and subsequently, the process returns to S1310. If the OS 122 cannot delete the current deletion candidate printer driver for some reason, an error message (not illustrated) is displayed indicating that the deletion has been impossible, and the process returns to S1310.

As described above, the print queues on the host computer are appropriately managed, and thereby, only the print queues required by the user can be kept, and next and subsequent selection of the print queue becomes easy. Specifically, a user, who is accustomed to conventional printing by using the generic/dedicated printer drivers, hopes to directly designate the print queue of the generic/dedicated printer drivers without involving the virtual printer driver, in the next and subsequent printing, if a printing environment is not particularly changed. According to this process, the unnecessary print queue is deleted, while the print queue desired by the user is kept. Therefore, convenience for the user is significantly improved.

Figure 14:
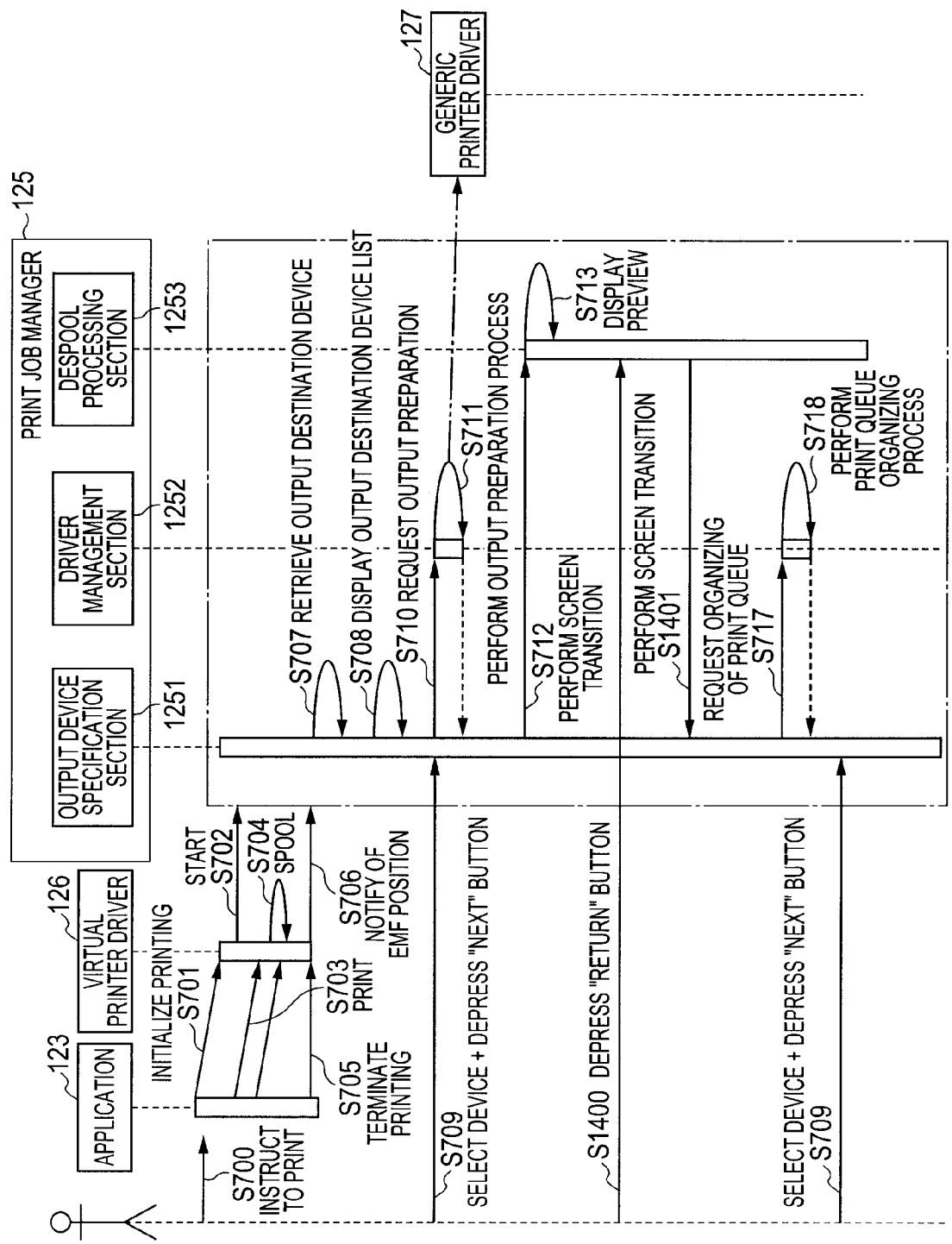
FIG. 14 is a sequence diagram in a case of returning to an OUTPUT DEVICE SPECIFICATION dialogue.

The print queue organizing process in a case where the "RETURN" button 8206 in the "EDITING PREVIEW" dialogue 8200 is depressed is illustrated by using a sequence diagram of FIG. 14. A sequence of S700 to S713 is the same process as in FIG. 7. Here, a description thereof is omitted.

In response to the depression of the "RETURN" button 8206 by the user in S1400, the print job manager 125 performs screen transition from the "EDITING PREVIEW" dialogue 8200 to the "OUTPUT DEVICE SPECIFICATION" dialogue 8100 (S1401). In response to the screen transition, the output device specification section 1251 issues a print queue organizing request to the driver management section 1252 (S717). Then, the driver management section 1252 executes the print queue organizing process with information designated in the "DESIGNATION OF DELETION METHOD" dialogue (S718). According to this process, the total number of the print queues can be suppressed even in the course of the printing process.

It should be noted that the driver management section 1252 does not need to execute the print queue organizing process (S718) each time the screen transition from the "EDITING PREVIEW" dialogue 8200 to the "OUTPUT DEVICE SPECIFICATION" dialogue (8100) is performed. For example, a method may be employed in which the number of times of the depression of the "RETURN" button 8206 in a current printing sequence is counted, and the driver management section 1252 executes the print queue organizing process for each certain number of times. A Subsequent printing sequence is similar to the procedure in and after S709 of FIG. 7, and the description thereof is herein omitted.

As described above, the execution of the print queue organizing process in the printing process sequence by using the virtual printer driver has been described by using the sequences of FIGS. 7 and 14.

It is not necessary to limit the execution of the print queue organizing process (S718) to the above described timing, and the print queue organizing process (S718) can also be performed at another timing by saving and managing the print queue which has been used in the actual printing, and the like, in the external memory. For example, at a timing of the next printing, the print queue organizing process (S718) may be executed before the output preparation process (S711) is performed. Moreover, a button may be provided in the user interface of the virtual printer driver 126 or the like, and in response to the depression of the button by the user, the print queue organizing process (S718) may be executed at a timing independent of the printing. Furthermore, for example, the print queue organizing process (S718) may be executed when the user logs on or logs off the host computer 101, which is a timing that is not directly related to the printing process, or the print queue organizing process (S718) may be executed by providing a periodical timer interval.

As a function provided by the OS 122, there is a function in which the print queue name after the placement can be changed to another name. In order to follow this change of the print queue name, in the above described configuration, the automatic generation identifier 306 and the update date and time 307 are saved in the data structure of the print queue 302 so that the change of the print queue name does not affect. If an operation in which the print queue name after the placement is not particularly changed is premised, there is no need to limit a destination to save the information, to the data structure of the print queue 302. For example, also, a data structure similar to the data structure of the print queue 302, with the print queue name as a key, can be prepared, and the automatic generation identifier 306 and the update date and time 307 can be saved in the external memory 121. Moreover, even if writing to the data structure of the print queue 302 cannot be performed due to access restriction or the like, the management can also be performed by similarly preparing another data structure.

In S1202 of FIG. 12, the driver management section 1252 describes the current date and time in the update date and time 307 of the data structure of the print queue 302. If a mechanism (S1202) is included in which the generic printer driver 127 and the dedicated printer driver 128 update the update date and time 307 when the printing is completed, the update date and time 307 can be updated also at the time of the printing through the direct designation of the generic printer driver 127 and the dedicated printer driver 128, without involving the virtual printer driver. Furthermore, if the OS 122 has an audit function for the printing, a status of usage of the print queue can be determined based on an audit log of the function. In that case, the determination can be realized without including a unique data structure as the update date and time 307.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-224833, filed Sep. 29, 2009, which is hereby incorporated by reference herein in its entirety.

What is claimed is:

1. An information processing apparatus which transmits a print job to a printer, comprising:
   a spool unit configured to spool data which is received from an application in response to an instruction from a user, as intermediate data;
   a retrieval unit configured to retrieve printers which are connected to the apparatus, after the instruction from the user;
   a display control unit configured to display a list of printers found by the retrieval unit so that a printer which performs a printing process is selected;
   an installation control unit configured to control an installation process for a printer driver which is compatible with the printer selected from the list of the printers displayed by the display control unit;

a creation unit configured to create a print queue corresponding to the printer driver installed by the installation control unit;

a despool unit configured to, in response to an instruction from the user to perform printing for the printer driver installed by the installation control unit, pass the intermediate data spooled by the spool unit to the printer driver;

a transmission unit configured to transmit a print job which is generated from the intermediate data passed by the despool unit by using the printer driver installed by the installation control unit, to the printer selected from the list of the printers displayed by the display control unit;

a decision unit configured to decide a deletion candidate in the print queues created by the creation unit; and a deletion unit configured to delete the print queue which is the deletion candidate decided by the decision unit, wherein the decision unit is configured to decide the deletion candidate in the print queues created by the creation unit, so that the number of the print queues does not exceed an upper limit number of print queues to be kept, and wherein the decision unit is configured to decide the print queue with used date and time information which is old, as the deletion candidate so that the number of the print queues does not exceed the upper limit number.

2. The information processing apparatus according to claim 1, wherein the display control unit is configured to enable the selection of the printer again from the list of the printers found by the retrieval unit, after the installation process and the creation of the print queue for the printer driver which is compatible with the printer selected from the list of the printers displayed by the display control unit, and the decision unit is configured to decide the deletion candidate in a plurality of the print queues created by the creation unit.

3. The information processing apparatus according to claim 1, wherein the decision unit is configured to eliminate the print queue corresponding to the printer driver to which the intermediate data has been passed by the despool unit, from the deletion candidate.

4. The information processing apparatus according to claim 1, wherein the decision unit is configured to eliminate the print queue which is selected by the user, from the deletion candidate.

5. The information processing apparatus according to claim 1, wherein an identifier configured to identify that the print queue has been created by the creation unit is set, and the decision unit is configured to decide the print queue to which the identifier is set, as the deletion candidate.

6. The information processing apparatus according to claim 1, wherein the deletion unit is configured to delete the print queue which is the deletion candidate, in any one of a case where the print job has been transmitted by the transmission unit, a case where a next printing instruction has been issued by the user, a case where the deletion has been designated by the user at an arbitrary timing, and a case where the user has logged on or logged off the information processing apparatus.

7. The information processing apparatus according to claim 1, wherein the deletion unit is configured to also delete the corresponding printer driver when the deletion unit deletes the print queue which is the deletion candidate.

8. A print control method carried out in an information processing apparatus which transmits a print job to a printer, the method comprising:

spooling data which is received from an application in response to an instruction from a user, as intermediate data;

retrieving printers which are connected to the apparatus, after the instruction from the user;

displaying a list of printers found in the retrieving so that a printer which performs a printing process is selected;

controlling an installation process for a printer driver which is compatible with the printer selected from the list of the printers displayed in the displaying;

creating a print queue corresponding to the printer driver installed in the controlling;

in response to an instruction from the user to perform printing for the printer driver installed in the controlling, despooling the intermediate data spooled in the spooling and passing the despooled intermediate data to the printer driver;

deciding a deletion candidate in the print queues created in the creating; and deleting the print queue decides as the deletion candidate in the deciding, wherein a print job which is generated from the intermediate data passed in the despooling by using the printer driver installed in the controlling is transmitted to the printer selected from the list of the printers displayed in the displaying, wherein the deciding decides the deletion candidate in the print queues created in the creating, so that the number of the print queues does not exceed an upper limit number of print queues to be kept, and wherein the deciding decides the print queue with used date and time information which is old, as the deletion candidate so that the number of the print queues does not exceed the upper limit number.

9. The method according to claim 8, wherein in the displaying, it is possible to select the printer again from the list of the printers found in the retrieving, after the installation process and the creation of the print queue for the printer driver which is compatible with the printer selected from the list of the printers displayed in the displaying, and the deciding decides the deletion candidate in a plurality of the print queues created in the creating.

10. The method according to claim 8, wherein the deciding eliminates the print queue corresponding to the printer driver to which the intermediate data has been passed in the despooling, from the deletion candidate.

11. The method according to claim 8, wherein the deciding eliminates the print queue which is selected by the user, from the deletion candidate.

12. The method according to claim 8, wherein an identifier is set to identify that the print queue has been created in the creating is set, and the deciding decides the print queue to which the identifier is set, as the deletion candidate.

13. The method according to claim 8, wherein the deleting deletes the print queue which is the deletion candidate, in any one of a case where the print job has been transmitted, a case where a next printing instruction has been issued by the user, a case where the deletion has been designated by the user at an arbitrary timing, and a case where the user has logged on or logged off the information processing apparatus.

14. The method according to claim 8, wherein the deleting also deletes the corresponding printer driver when the deleting deletes the print queue which is the deletion candidate.

15. A non-transitory computer-readable storage medium that stores a computer program for causing a computer to execute the method according to claim 8.

16. A print control method carried out in an information processing apparatus which transmits a print job to a printer, the method comprising:
spooling data which is received from an application in response to an instruction from a user, as intermediate data;
controlling an installation process for a printer driver which is compatible with a printer to print;
creating a print queue corresponding to the printer driver installed in the controlling;
in response to an instruction from the user to perform printing for the printer driver installed in the controlling, despooling the intermediate data spooled in the spooling and passing the despooled intermediate data to the printer driver;
deciding a deletion candidate in the print queues created in the creating; and
deleting the print queue decides as the deletion candidate in the deciding,
wherein a print job which is generated from the intermediate data passed in the despooling by using the printer driver installed in the controlling is transmitted to the printer,
wherein the deciding decides the deletion candidate in the print queues created in the creating, so that the number of the print queues does not exceed an upper limit number of print queues to be kept, and
wherein the deciding decides the print queue with used date and time information which is old, as the deletion candidate so that the number of the print queues does not exceed the upper limit number.

17. A non-transitory computer-readable storage medium that stores a computer program for causing a computer to execute the method according to claim 16.

* * * * *